July 31, 1951 — H. H. CARY — 2,562,525
INFRARED SPECTROPHOTOMETER
Filed Jan. 14, 1947 — 7 Sheets-Sheet 1
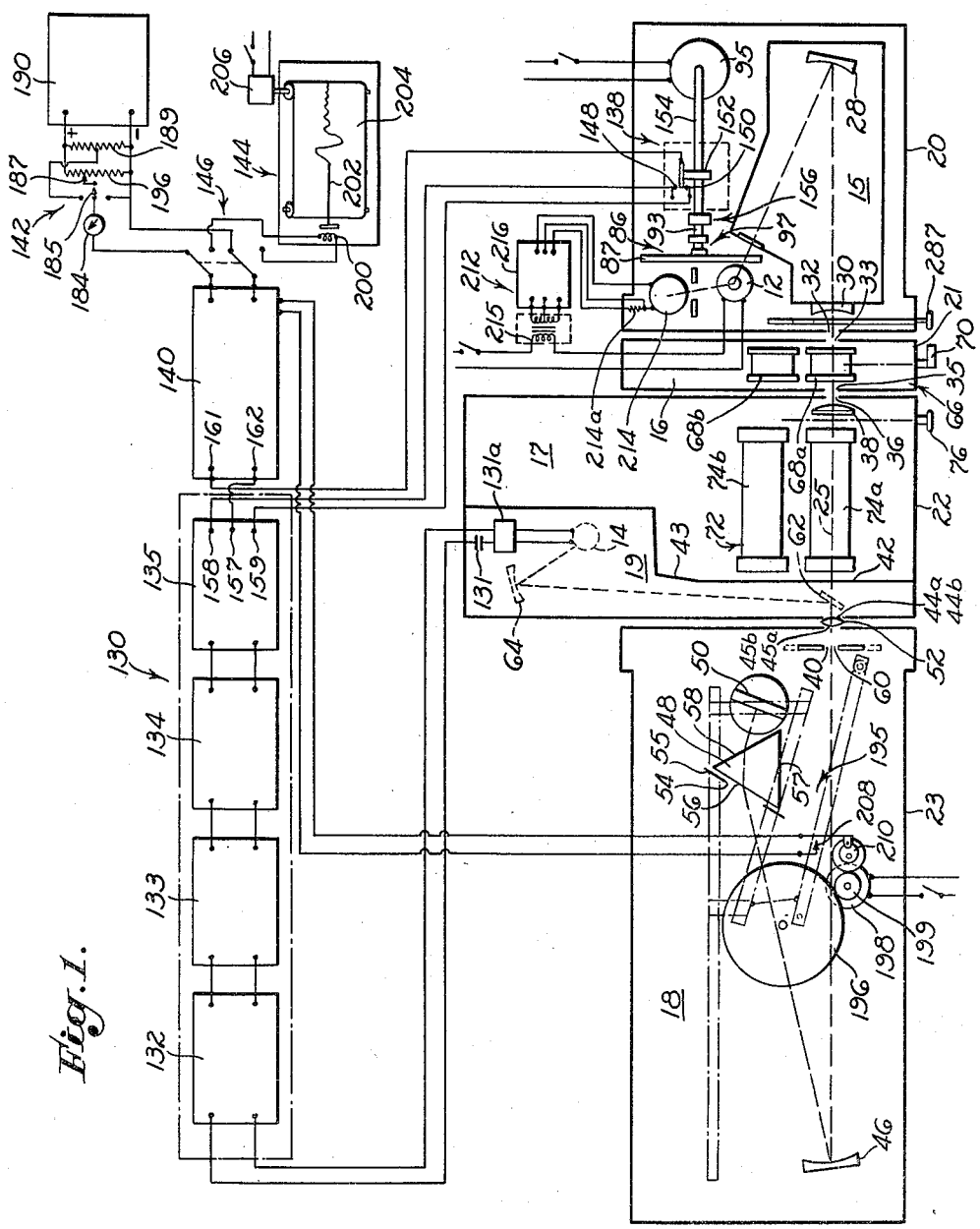
Fig.1.
INVENTOR.
HENRY H. CARY
BY HIS ATTORNEYS.
HARRIS, KIECH, FOSTER & HARRIS
BY

July 31, 1951     H. H. CARY     2,562,525
INFRARED SPECTROPHOTOMETER
Filed Jan. 14, 1947     7 Sheets-Sheet 2

INVENTOR.
HENRY H. CARY
BY HIS ATTORNEYS.
HARRIS, KIECH, FOSTER & HARRIS

July 31, 1951  H. H. CARY  2,562,525
INFRARED SPECTROPHOTOMETER
Filed Jan. 14, 1947  7 Sheets-Sheet 3
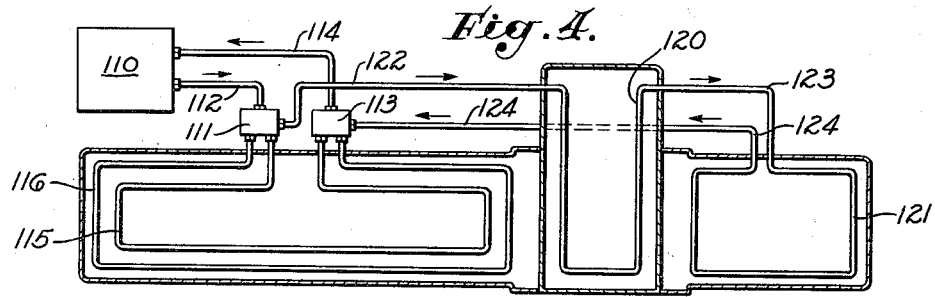
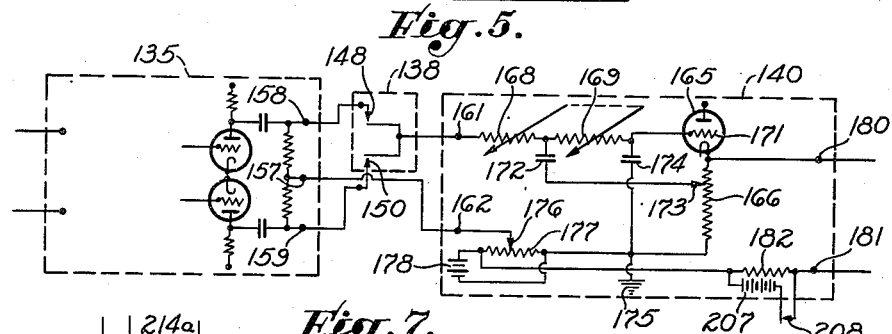
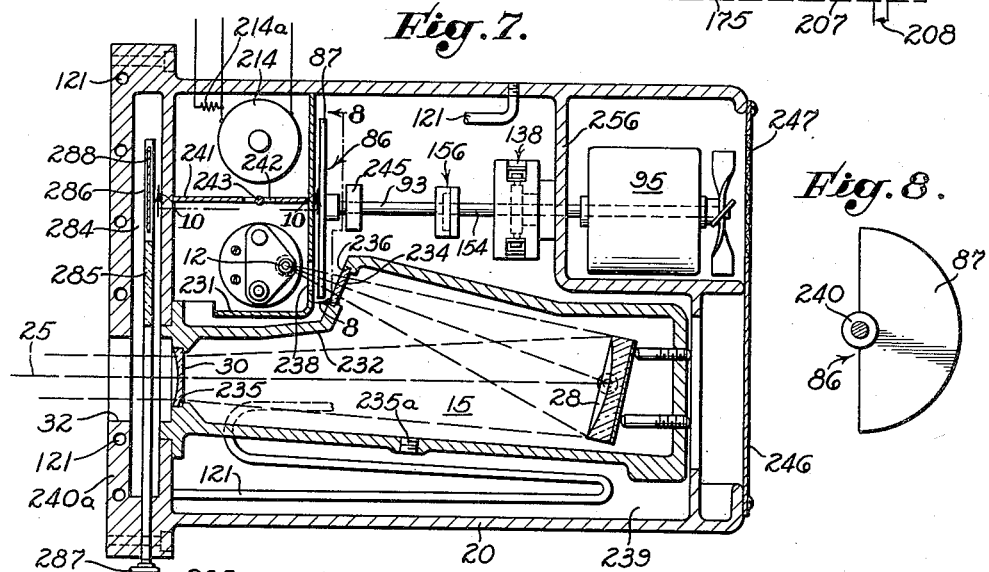
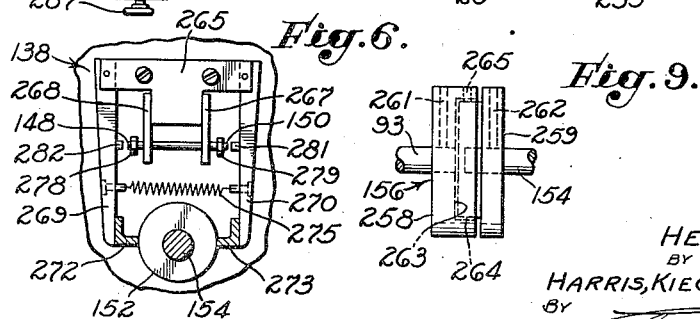
INVENTOR.
HENRY H. CARY
BY HIS ATTORNEYS.
HARRIS, KIECH, FOSTER & HARRIS
BY
Clarence F. Kiech July 31, 1951 H. H. CARY 2,562,525
INFRARED SPECTROPHOTOMETER
Filed Jan. 14, 1947 7 Sheets-Sheet 4

INVENTOR.
HENRY H. CARY
BY HIS ATTORNEYS:
HARRIS, KIECH, FOSTER & HARRIS

July 31, 1951  H. H. CARY  2,562,525
INFRARED SPECTROPHOTOMETER
Filed Jan. 14, 1947  7 Sheets-Sheet 5
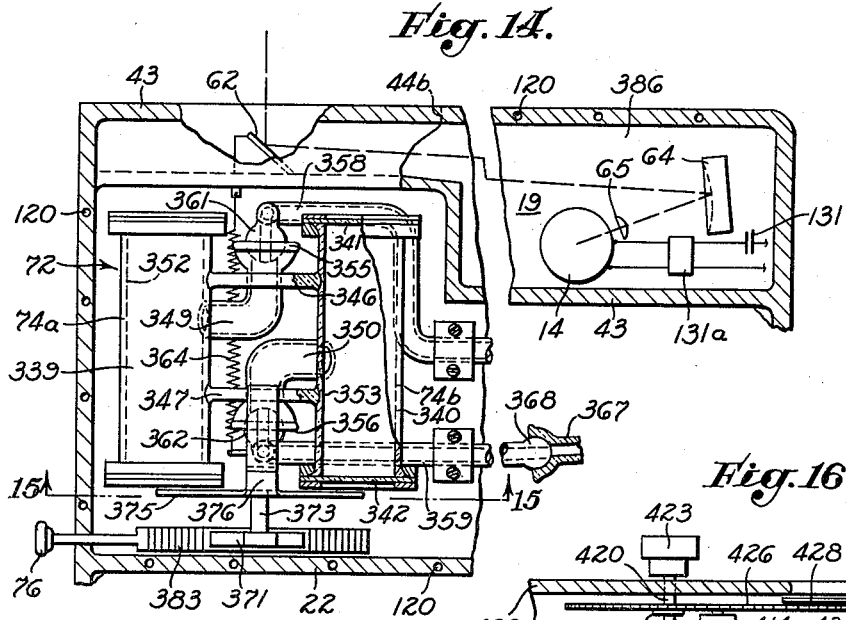
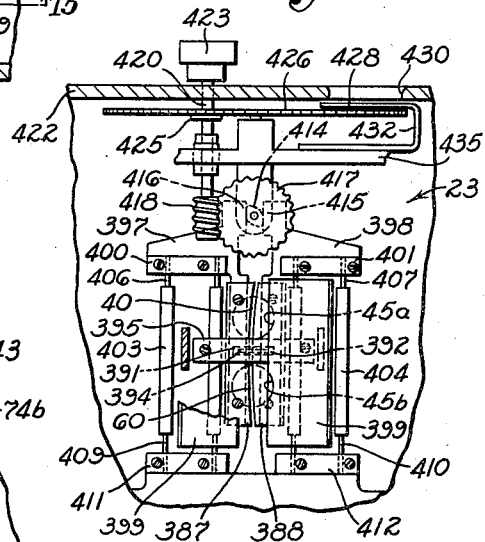
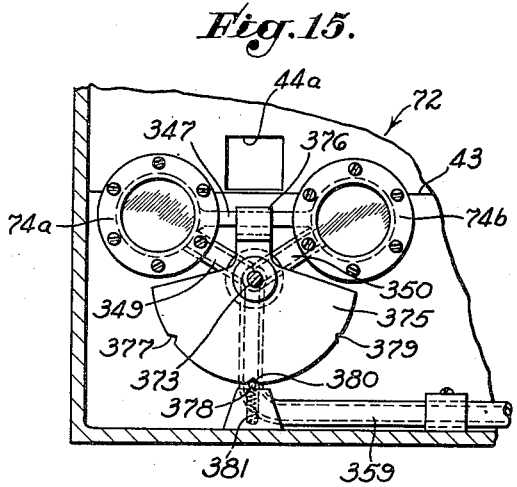
INVENTOR.
HENRY H. CARY
BY HIS ATTORNEYS.
HARRIS, KIECH, FOSTER & HARRIS
BY Clarence F. Kiech

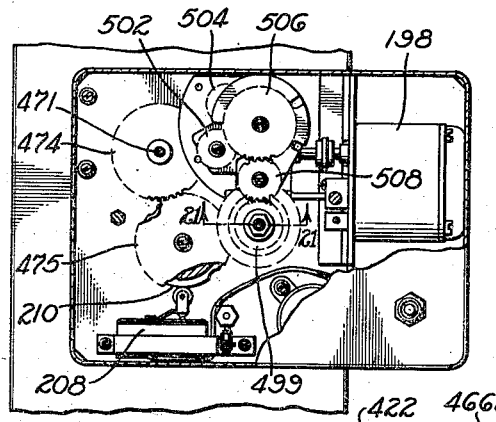
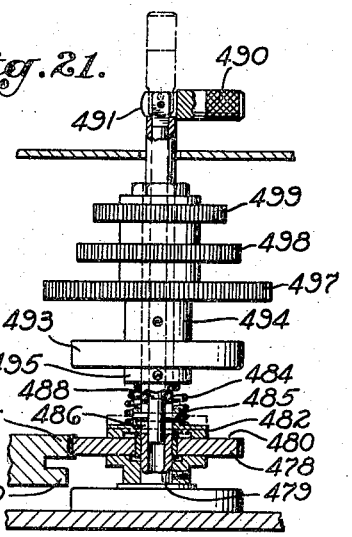
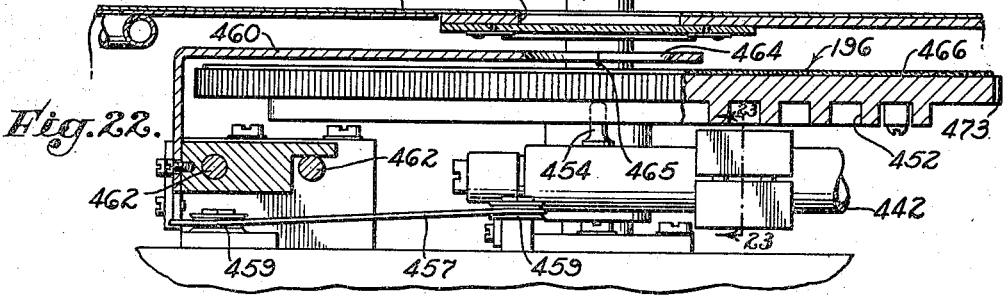
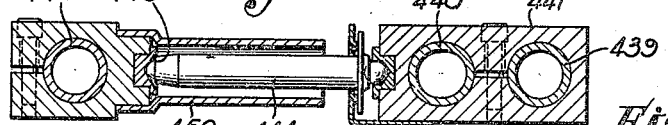
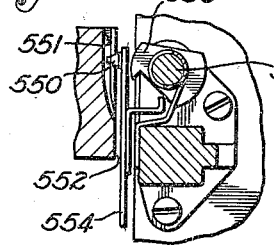
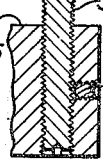
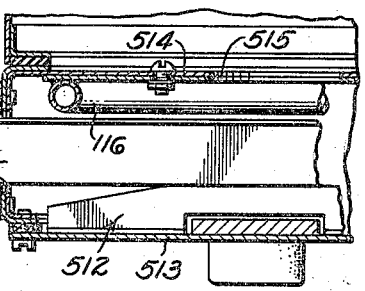

July 31, 1951 H. H. CARY 2,562,525
INFRARED SPECTROPHOTOMETER
Filed Jan. 14, 1947 7 Sheets-Sheet 7
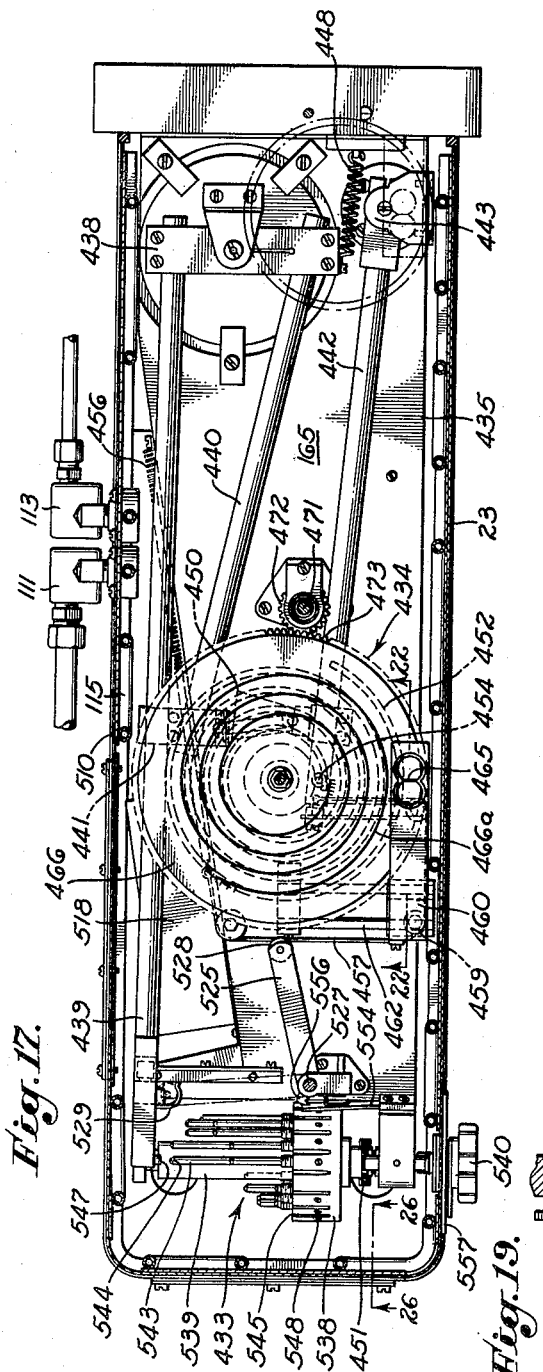
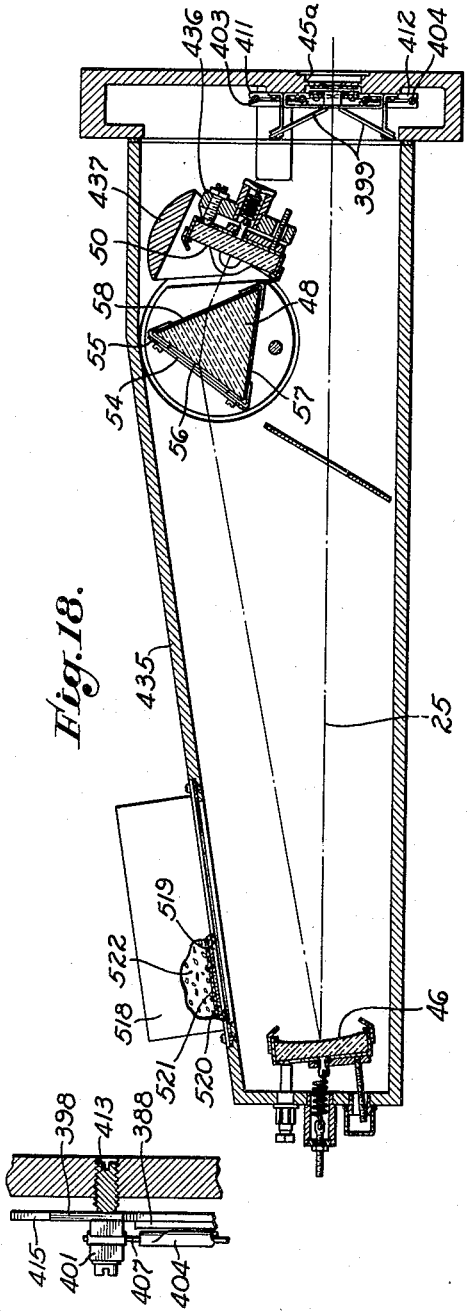
INVENTOR.
HENRY H. CARY
BY HIS ATTORNEYS.
HARRIS, KIECH, FOSTER & HARRIS Patented July 31, 1951

2,562,525

UNITED STATES PATENT OFFICE 2,562,525

INFRARED SPECTROPHOTOMETER

Henry H. Cary, Alhambra, Calif., assignor to Beckman Instruments, Inc., a corporation of California Application January 14, 1947, Serial No. 722,039

24 Claims. (Cl. 250—43)

This invention relates to the art of spectrometry and more particularly to improved apparatus for making chemical analyses by absorption spectrophotometry.

While the principles involved in this invention may be applied to various types of spectrometers, and various methods of spectrometry, the invention finds its widest application in the field of infra-red spectrometry. Accordingly, the principles of the invention will be illustrated with particular reference to their application in the field of infra-red spectrometry. However, it is to be understood that these principles may also be applied to other forms of spectrometry, so that the disclosure of the specific application of these principles in the field of infra-red spectrometry, is not to be considered a limitation of the invention thereto.

In the practice of absorption spectrometry, radiation is usually transmitted from a source through a monochromator to a radiation detector by means of a suitable optical system. Spectrometers have recently been widely used for analyzing chemical mixtures and in such instruments it is customary to use as a source of radiation a radiating element which emits radiation which is rich in energy in the wavelength region under investigation, even though the distribution of energy in the region in question be far from uniform. The radiation transmitted from the source into the monochromator is separated therein by a dispersing element such as a prism or grating so as to enable the projection of selected radiation, that is, radiation in a narrow predetermined wavelength band, to the detector. The optical system generally includes lenses, mirrors, and filters. Usually the detector is in the form of a thermocouple or other radiation sensitive device and a change occurring in some property of the detector in accordance with the intensity of radiation falling therein is measured by means of an electrical circuit connected thereto.

In the practice of spectrometry, numerous difficulties are encountered which render the analysis tedious and expensive, and sometimes even inaccurate.

In particular, when analyzing liquid or solid samples, it is found that the insertion of the sample into the path of the beam alters the optical paths to such an extent that the size and shape of an image in the optical path is also often modified to such an extent that the sensitivity of the system is seriously changed. The refocusing or recalibration, of the spectrometer under such circumstances is, to say the least, highly undesirable.

Another problem arising in the practice of spectrometry results from the fact that the intensity of radiation emitted from the source may fluctuate. Ordinarily, attempts are made to overcome this difficulty by utilizing a null or balancing technique wherein two beams from the source are detected, one of the beams traveling along one path and through the sample under test, and the other traveling along a second path but not through that sample. This of course results in a multiplication of numerous optical elements in the spectrometer or in the uneconomical use of those present. It has the further objection that the difficulties of producing and maintaining spectral equivalance of the two optical paths are great, particularly in the infra-red wavelength regions where it may be necessary to use easily damaged materials such as rock salt as optical elements.

In the art of spectrometry it is generally considered desirable to provide an arrangement which is suitable for making measurements at selected predetermined wavelengths and also alternatively to scan a wide continuous portion of the spectrum to obtain a record of intensities at all wavelengths in that portion. In making such measurements, fluctuations in the signal strength occur because of electrical or other variations, often termed noise, having their origin in various parts of the apparatus such as in an electrical amplifier connected to the detector. Also in making such measurements, inaccuracies may arise because radiation from the walls of the spectrophotometer reach the detector along with the selected radiation of which a measurement is desired. Inaccuracies are also found to arise from dimensional and other changes in the apparatus attendant upon temperature changes.

It is often desirable to use a rotating shutter for periodically intercepting the beam of radiation transmitted from the source to the detector and to use an amplifying system which is selectively responsive to a signal striking the detector at the frequency of beam interruption. The use of such an arrangement serves two main purposes. First, it reduces the effect of variation in the temperature of the wall of the spectrometer, insofar as such variation in temperature produces changes in the amount of stray radiation reaching the detector. This is especially important in the infra-red region wherein such variations are particularly serious because of the large amount of black-body radiation in the wavelength region in question at normal atmospheric temperatures. Secondly, the use of such a system facilitates the application of alternating-current amplifier design techniques in the indicating system.

Having in mind the problems present in the art of spectrometry, and also the requirements desired in a commercial instrument, it is a general object of the invention to provide an improved spectrometer of compact, flexible construction in which these and other difficulties are overcome.

Another object of the invention is to provide an improved spectrometer which permits reliable operation in the infra-red region.

Another object of the invention is to provide an infra-red spectrometer utilizing a novel and simple optical system.

Another object of the invention is to provide a spectrometer with an improved monochromator which is adapted for scanning an entire spectrum or, in the alternative, to select radiation of any one of a series of predetermined wavelengths.

Another object of the invention is to provide an improved means for calibrating a monochromator for selectively setting it on any one of a series of predetermined wavelengths.

Another object of the invention is to provide a spectrometer having convenient sample-testing means adapted for investigating solid, liquid, and gas samples.

Another object of the invention is to provide a spectrometer with a liquid-sample testing arrangement which permits the insertion and removal of a non-gaseous sample from the path of the beam without seriously disturbing the overall optical adjustment and calibration.

Another object of the invention is to provide a spectrometer in which the optical system establishes a region in which the beam is collimated and a region in which the beam is not collimated to provide a means for inserting liquid or other non-gaseous samples in the region of the collimated beam and gas samples in the region of the non-collimated beam, so as to facilitate use of the spectrometer for analysis of either kind of sample without requiring readjustment of optical focus.

Another object of the invention is to provide a spectrometer which utilizes only a single beam but which is substantially free of spontaneous calibration fluctuations, either whose resulting from "zero shift," or changes in instrument response when the radiation beam from the source to the detector is cut off for extended periods of time, or those resulting from fluctuations in emission from the source.

Other objects of this invention, together with numerous advantages thereof, will become apparent in the course of the following detailed description of the invention as applied to an infra-red spectrophotometer:

Referring to the accompanying drawings, wherein like numerals in the several views refer to identical parts:

Fig. 1 is a schematic diagram of a spectrophotometer incorporating the features of this invention;

Fig. 4 is a schematic diagram illustrating the temperature-regulating system of the spectrophotometer;

Fig. 5 is a wiring diagram of a portion of the amplifier circuit including the mechanical rectifier;

Fig. 6 is a diagram illustrating mechanical details of the mechanical rectifier;

Fig. 7 is a plan view, partly in section and partly schematic, showing details of construction of the compartment of the spectrophotometer, including the source of radiation;

Fig. 8 is an end view of the rotating shutter taken on the line 8—8 of Fig. 7;

Fig. 9 is a detailed view of the shutter shaft coupling;

Fig. 14 is a plan view, partly in section, of the gas-sample compartment of the spectrophotometer;

Fig. 15 is an end view of the gas-sample holding apparatus taken on the line 15—15 of Fig. 14;

Fig. 16 is an elevational view of the slit-width-control mechanism of the monochromator;

Fig. 17 is a plan view, partly in section, of the monochromator;

Fig. 18 is a horizontal sectional view of the auxiliary compartment within the monochromator;

Fig. 19 is a fragmentary detailed view of the slit-width-control mechanism;

Fig. 20 is a fragmentary view of the scanning drive mechanism;

Fig. 21 is a fragmentary elevational view of a portion of the clutching and speed-changing mechanism taken on the line 21—21 of Fig. 20;

Fig. 22 is a fragmentary elevational view of the scanning mechanism;

Fig. 23 is a fragmentary sectional view of the scanning linkage taken on line 23—23 of Fig. 22;

Fig. 24 is a fragmentary view of the wavelength-setting mechanism;

Fig. 25 is a detailed view of a wavelength-setting pin; and

Fig. 26 is a fragmentary view of the lower portion of the monochromator taken on the line 26—26 of Fig. 17.

*Apparatus in general*

Figure 2:
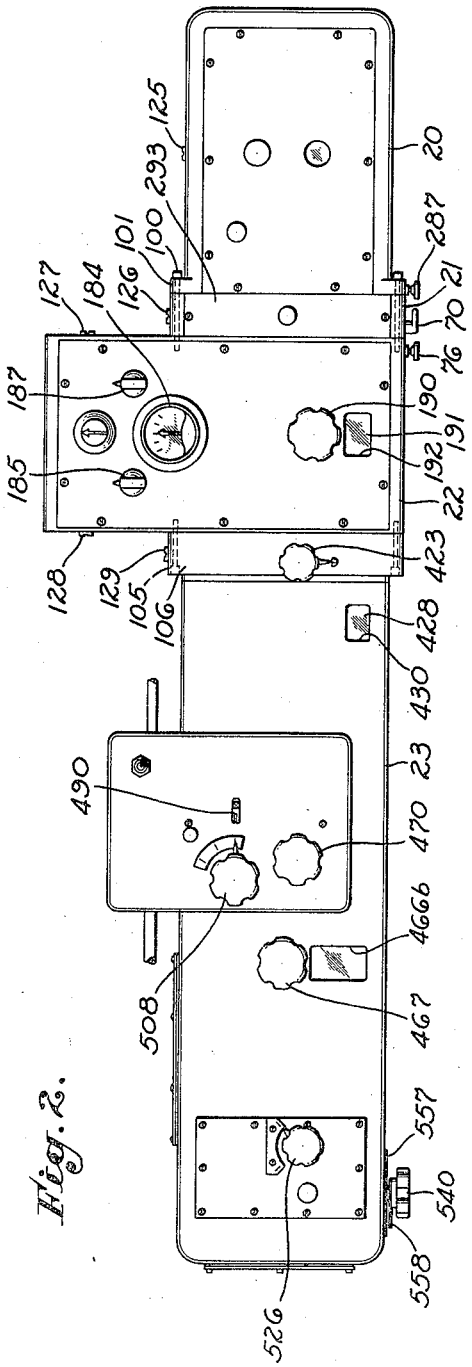
Fig. 2 is a plan assembly view of the entire spectrophotometer.

Referring to the drawings and more particularly to Fig. 1, there is illustrated a spectrophotometer embodying the features of this invention. This spectrophotometer includes an optical system for transmitting radiation in a selected narrow predetermined wavelength band from a radiation source 12 to a radiation detector 14 along a predetermined path passing through an auxiliary gas-sample test region 15, a liquid-sample test region 16, a gas-sample test region 17, and a monochromator 18. The monochromator 18 separates heterogeneous radiation into its components and directs radiation of a selected predetermined wavelength band in a predetermined wavelength range to the detector at the choice of the operator. The optical elements of the spectrometer are composed of such material that radiation in a wide range of wavelengths may be transmitted from the source 12 to the detector 14. For example, if these optical elements are formed of rock salt, wavelengths between about 1.0μ and 15μ may be transmitted. If formed of potassium bromide the useful range will be about 4–25μ or if formed of lithium fluoride a range of about 0.185–6μ is practicable.

The source 12 may be of the incandescent type, such as a Nernst glower, operated at a temperature of about 1500° K. or higher. With such a source, energy is concentrated in the lower wavelength portion of the spectrum at about 2μ. However, the principles of operation of the infrared spectrophotometer of this invention are equally applicable even though the source 12 be operated at a different temperature or even though it be of a different kind.

Generally speaking, the spectrophotometer itself comprises four compartments 20, 21, 22 and 23, interconnected in light-tight relation except for intercommunicating apertures intended to pass selected radiation. The first compartment 20 includes the light source 12 and the auxiliary gas-sample region 15; the second compartment 21 provides the liquid-sample testing region 16; the third compartment 22 provides the gas-sample testing region 17; the fourth compartment 23 encloses the monochromator 18. An auxiliary compartment section 19 in the compartment 22 includes the radiation detector 14. The compartment section 19 is sealed off from the remainder of the compartment 22 by means of walls 43 so that no radiation can reach the detector 14 without first passing through the monochromator.

Considering the path of radiation through the spectrophotometer, it is to be noted that the four compartments are provided with various windows which are registered on a straight-line path 25 extending through the four compartments and along which the radiation travels. More particularly, heterogeneous radiation diverging from the source 12 is transmitted to a concave mirror 28 at one end of the path 25 and inclined thereto in the auxiliary gas-sample testing region 15. This mirror reduces the divergence of the radiation and reflects it as a beam along the path 25. The reflected radiation is collimated by a negative lens 30 and projected through an exit aperture 32 of the compartment 20 and an entrance aperture 33 of the liquid-sample compartment 21, and thence through an exit aperture 35 thereof and into the gas-sample compartment 22 through an entrance aperture 36 of the latter. It is to be noted that the radiation projected through the liquid-sample compartment is collimated throughout the portion of its path in that compartment. This enables the insertion of a liquid, or solid, sample in this portion of the path without disturbing the overall focusing effects of the optical system between the source 12 and the entrance slit of the monochromator. It also permits insertion of alternative compartments of various lengths in place of compartment 21 without seriously altering these focal adjustments, with the advantage that a great variety of absorption cells or other devices as required by the user may be provided in this compartment.

Upon entering the gas-sample compartment 22, the collimated beam is directed by a positive lens 38 along converging paths so as to concentrate upon an entrance slit 40 of the monochromator 18, the radiation being transmitted thereto along a path passing above the walls 43 of the compartment section 19 and through an exit aperture 44a of the gas-sample compartment 22, and through an entrance aperture 45a in the monochromator. The radiation passing through the entrance slit 40 of the monochromator continues along the path 25 to a concave mirror 46, inclined thereto and which reflects the radiation to a dispersing system of the Littrow type including a 60-degree rock-salt prism 48 and a rotatable flat Littrow mirror 50. A positive lens 52 arranged between the exit aperture 44a of the gas-sample testing compartment and the entrance aperture 45a of the monochromator focuses an image of the entrance aperture 36 of the gas-sample compartment 22 upon the aperture stop 54 defined by mask 55, shown in section, at the front face 56 of the prism 48.

The beam which enters the front face 56 of the prism is refracted toward the base 57 thereof and emerges from the rear face 58 of the prism being again refracted along the line directed toward the Littrow mirror 50. Because of the dispersion characteristics of the prism, components of the radiation of different wavelengths emerge from the rear face 58 of the prism in different directions. That radiation having such a wavelength that it travels substantially perpendicularly to the Littrow mirror is reflected thereby along a reverse or return path. This reflected beam enters the rear face 58 of the prism, emerges from the front face 56 thereof, traveling rearwardly to the concave mirror 46 and thence rearwardly along but somewhat below the path 25 toward an exit slit 60 which is located immediately below the entrance slit 40 when viewed as in Fig. 1.

The arrangement of the optical elements of the spectrophotometer is such that reflected radiation of a central wavelength within the selected wavelength band arriving at the exit slit 60 forms there an image of the entrance slit 40, so that most of the radiation of predetermined wavelength travels outwardly of the monochromator along a path which is displaced vertically downward from the entrance slit 40 as mentioned. Radiation of other wavelengths travels generally toward the exit slit 60 along displaced paths, the optical arrangement of the monochromator being such that radiation of different wavelengths is focused at different positions in an approximately plane surface which passes vertically through the slits 40 and 60 and lies generally transverse to the beam path 25. The exit slit 60 thus serves to select a narrow wavelength band from the spectrum which is focused upon that surface in a dispersed manner as regards its wavelength. It is to be understood in this specification that where reference is made to selected radiation or to radiation of a selected wavelength, actually radiation in a selected wavelength band having its center at about the wavelength in question is intended. In the usual case this band is very narrow and is defined primarily by the widths of the entrance and exit slits 40 and 60 of the monochromator and the dispersing characteristics of the prism.

In practice, the entrance and exit slits 40 and 60 are located on one side of all normals to the curved surface of the mirror 46 while, at the same time, the working surface of the prism 48 defined by the aperture stop 54 lies on the opposite side of these normals. This arrangement minimizes the intensity of any supplementary and undesired spectra that might otherwise appear in the plane of the exit slit 60 due to the return from the collimating mirror 46 to the prism 48 of radiation previously dispersed by the prism and subsequently reflected or scattered by the mirror 46. Such supplementary spectra are further minimized by so orienting the prism 48 that the intensity of radiation in the spectrum formed in the plane of the exit slit 60 increases with distance from those normals.

The selected energy travels along a path outwardly of an exit aperture 45b located in the monochromator compartment directly beneath the entrance aperture 45a and beneath the lens 52 and thence through an aperture 44b in the compartment section 19 directly beneath the aperture 44a. The selected radiation entering the compartment section 19 travels to an inclined flat mirror 62 in this compartment section. This mirror 62 reflects the selected radiation toward a concave mirror 64 which in turn concentrates the radiation in the direction of the radiation detector 14 and, in conjunction with lens 65, forms an image of the exit slit, much reduced in size, on the photo-detector 14.

It is to be noted that the gas sample portions of the optical path are in regions where the beam is converging or diverging, and where any marked alteration of the effective optical path length would require refocusing of the optical elements for optimum performance. On the other hand, in the portion of the optical path adapted to accommodate liquid or solid samples the beam is collimated, that is, in the condition in which even after a relatively marked alteration of effective path length a readjustment of the focus will not increase the intensity of the radiation focused in the plane of the entrance slit. The image of the source in the plane of the entrance slit may be, and desirably is, larger than the entrance slit, so that small changes of focus in the optical path have negligible effect on over-all instrument performance. Further, the effect of varying the optical path in the collimated region aforesaid is only to alter the position of the solid angles over which the radiation from the source is used, and not their magnitude or the size or intensity of the image of the source.

It will be noted that the length of the optical path in the liquid-sample region 16 is relatively short, but may readily be made longer by substitution of alternative compartments of various lengths, and this without requiring refocusing; while the path in the gas-sample region 17 or the auxiliary gas-sample cell region 18 is long and not readily varied in length without profound alteration of the design. In this connection it should be understood that, ordinarily, equal lengths of a liquid or solid sample and of a gas sample will produce widely different shortening of the geometrical optical path therethrough, the liquid or solid sample having much the more profound effect, as indicated by the large divergence of its refractive index from unity. Preferably, the gas-sample testing means is placed in diverging and converging regions of the beam. Furthermore, ordinarily, liquid samples absorb much more radiation than gas samples of equal path length. It is found advantageous to use a relatively long gas sample and a relatively short liquid sample in studies of the spectral absorption characteristics of each.

Several advantages therefore result from the orientation of the sample handling means relative to the focusing means in this instrument: it is optically efficient under all conditions of use; it is versatile, yet relatively small and compact; and lastly, it is flexible in the sense that it is easily adapted to uses not specifically disclosed herein.

To facilitate analysis of liquid samples, a liquid-sample holder 66 having two liquid-sample cells 68a and 68b is located in the liquid-sample compartment 21. This holder 66 is arranged to be transversely movable by means of a first manually-controllable operating rod 70 that extends through the wall of the compartment 21, so that either of the liquid-sample cells alone may be positioned on the path 25 to intercept the collimated beam or so that both sample cells may be withdrawn from the beam completely, if desired, as will be later described in more detail.

In a similar manner, a gas-sample holder 72 having two gas-sample cells 74a and 74b is located in the gas-sample compartment 22. The latter holder is likewise arranged to be shifted by means of a second manually controllable operating rod 76 that extends through the wall of this compartment, so that either of the gas-sample cells alone may be positioned on the path 25 to intercept the non-collimated beam and so that both of these sample cells may be withdrawn from the beam completely, if desired, as later described in greater detail.

Like liquid samples, solid samples also affect the effective optical path length profoundly. To avoid such effects when analyzing solid samples, these samples are introduced into the path of the beam within the "liquid"-sample compartment 21 where the beam is collimated, this chamber therefore serving in general for the analysis of non-gaseous samples.

While this spectrophotometer is designed to direct radiation of only one predetermined wavelength to the detector 14 at a time, in practice it is found that radiation of other wavelengths, particularly black-body radiation, from the walls of the spectrophotometer also strikes the detector simultaneously. In this spectrophotometer the effects of such radiation are minimized by periodically varying the intensity of the radiation transmitted from the source 12 to the detector 14 and measuring only the periodic variation of intensity of the detected radiation.

The periodic variation of intensity of radiation transmitted to the detector 14 is accomplished by means of a shutter 86 which comprises an opaque sector 87 of about 180° in extent mounted directly upon a shaft 93 driven by a synchronous motor 95. The shaft 93 is arranged adjacent the source 12 and parallel to the path 25 so that when it rotates the sector 87 interrupts the beam at regular intervals, thus periodically varying the rate of flow of radiation from the source 12 to the detector 14 at a predetermined frequency.

In making measurements with this spectrophotometer throughout the entire spectrum, the spectrum is scanned by slowly turning the Littrow mirror 50 about its vertical axis (perpendicular to the paper in Fig. 1) so as to sweep the spectrum past the exit slit 60 thus causing energy of different selected wavelengths to be focused upon the radiation detector successively. But when it is desired to obtain a spectral measurement of only one wavelength at a time, the Littrow mirror 50 is set at a series of predetermined positions wherein radiation of the corresponding particular wavelengths desired is focused upon the exit slit 60 and transmitted to the radiation detector. In both cases the periodic variation in intensity of radiation reaching the detector 14 is measured at each wavelength in question to determine the amount of selected wavelength radiation being transmitted to the detector.

Operation in general

In analyzing a chemical mixture containing a plurality of chemically different components with this spectrophotometer, a sample of the mixture and samples of each of the pure components are successively disposed in the path of the radiation transmitted from the source to the detector. If liquid or solid samples are being tested, they are inserted in the portion of the path in the liquid-sample test region where the beam is collimated. If gas samples are being tested, they are usually inserted in a gas-sample test region in an uncollimated portion of the beam. In any case, a series of measurements at different wavelengths is made on each of the samples to determine the quantity of radiation transmitted through each of the respective samples at each of the wavelengths in question by the processes hereinabove described. The intensities of such radiation transmitted to the detector may also be determined with no sample whatever disposed in the path of the beam, in order to determine the proportion of such radiation absorbed by each of the samples at the respective wavelengths. The data so obtained for the mixture and for the components are then analyzed mathematically in order to determine the proportion of each component present in the mixture.

Compartment assembly

Figure 3:
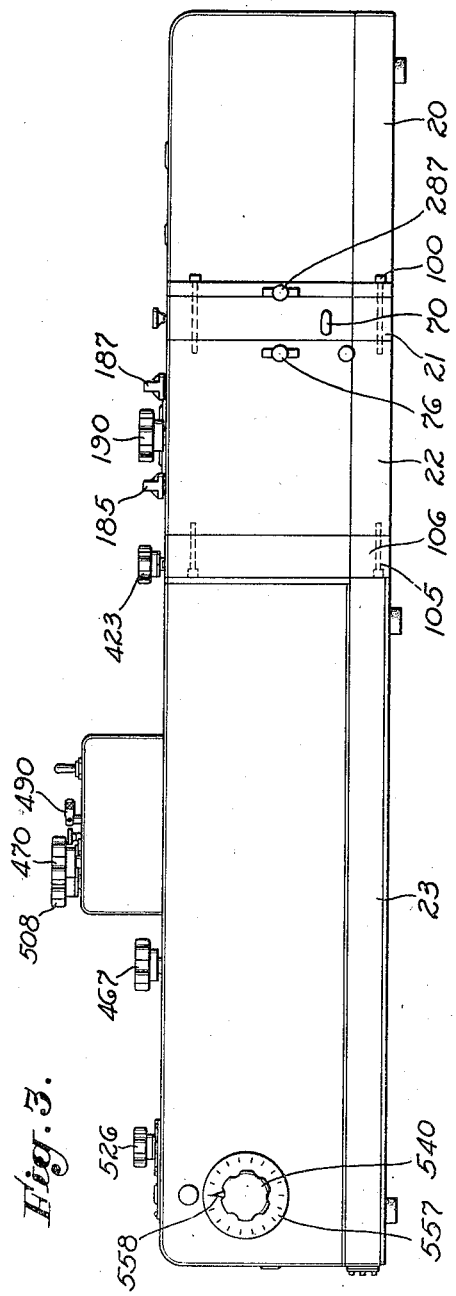
Fig. 3 is a front assembly view of the entire spectrophotometer.

Referring to Fig. 3, it will be noted that the four compartments 20, 21, 22, and 23 are firmly secured together to form a single rigid instrument. In particular this is achieved by means of screws 100 passing through a flanged portion 101 at one end of the compartment 20 and also passing through the front and rear walls of the liquid-sample compartment 21 into the adjacent side wall of the gas-sample compartment 22. Likewise, screws 105 pass through a flanged portion 106 at one end of the monochromator 23 into the adjacent side wall of the gas-sample testing compartment 22.

Temperature regulation

The temperature of the walls of the various compartments of the spectrophotometer is regulated by circulating a temperature regulating fluid, such as oil, through liquid flow passages in the walls of the various compartments. The general arrangement by which this is accomplished in the present instance is illustrated in Fig. 4. A temperature regulator 110 is connected to an inlet manifold 111 through a conduit 112 and to an outlet manifold 113 through a conduit 114. The temperature of the monochromator 23 is regulated by means of two conduits 115 and 116 arranged therein, each of these conduits being connected to the two manifolds 111 and 113. The temperature of the gas-sample compartment 22 and the temperature of the source compartment 20 is regulated by means of passages 120 in the gas-sample compartment 22 and passages 121 in the source compartment 20, these two sets of passages being connected in series between the two manifolds 111 and 113 by means of conduits 112, 123, and 124. The liquid-sample compartment 21 is not provided with liquid passages but its temperature is regulated by virtue of the fact that it is connected in good thermal contact between adjacent walls of the source compartment 20 and the gas-sample compartment 22.

In the preferred embodiment of the invention, the regulator 110 comprises suitable mechanism for regulating the temperature of the liquid returned thereto through the conduit 114 to a standard temperature, preferably that at which the calibration of the wavelength-adjusting mechanism was originally set.

By controlling the temperature of the compartments in the manner hereinabove explained, the calibration of the spectrophotometer is accurately maintained. In the absence of such temperature regulation, larger variations would be encountered in the wavelength calibration of the mechanism (hereafter described in detail) for setting the Littrow mirror 50 at predetermined positions corresponding to predetermined wavelengths. Furthermore, in the absence of such temperature regulation, variations in the spectral characteristics of various samples are liable to be encountered, especially when the sample includes material in which the spectral absorption characteristics change profoundly with temperature. A further advantage of employing temperature regulated compartments lies in the fact that critical elements of various electrical circuits associated with the spectrophotometer may be mounted within the temperature regulated compartments and the electrical characteristics of these elements maintained constant.

Humidity control

Also, for long life and greater reliability, particularly under adverse climatic conditions, the rock salt optical elements within the spectrophotometer are protected from damage due to moisture in the air by installing suitable desiccators (not all shown) at various points in the respective compartments. Furthermore, the use of desiccators may further enhance the reliability of the instrument by virtue of the fact that otherwise the presence of a larger amount of moisture in the air would seriously affect the over-all sensitivity of the spectrophotometer, especially in the regions of the more intense absorption bands of water vapor.

Alternatively, humidity control may be accomplished by passing through the various compartments and sections a stream of gas of controlled composition. In this connection, plugs 125 to 129 (Fig. 2) may be removed for connecting a source of such gas. The hole closed by plug 125 opens on the interior of the compartment 20. Likewise, that closed by the plug 126 opens on the test region 16, while the corresponding holes closed by plugs 127, 128 and 129 communicate with the test region 17, the compartment section 19, and the compartment 23, respectively. Leakage from the several spaces provides for the exit of such gas.

Electrical circuits

In order to measure the intensity of radiation of a selected wavelength falling upon the radiation detector 14 irrespective of the presence of stray black-body radiation also reaching the detector, the output of the detector 14 is preferably applied to an amplifying unit 130 which discriminates between the D. C. component of the detector output and the pulsating component therein. This discrimination may be obtained most readily by connecting the detector 14 in the input of the amplifying unit through a coupling condenser 131. In practice this coupling condenser is mounted within the compartment 22 adjacent the detector 14 together with the various electrical circuits represented by the symbol 131a associated with the detector. Such circuits may include power supplies, transformers, and like elements.

In practice the amplifying unit 130 is designed to be selectively responsive to input signals having the same frequency as the frequency of beam interruption. This amplifying unit may comprise, for example, a tuned alternating-current amplifier 132, an attenuator 133, a rejection filter 134 and a second tuned alternating-current amplifier 135 connected in tandem.

The amplifier 132 serves to increase the strength of the signal immediately. The attenuator 133 is connected in the output of the amplifier and is variable so that it may serve to reduce the strength of the amplified signal to any desired level. The rejection filter 134 is preferably of a type which suppresses signals of any particular undesired frequency that may be present, such as signals picked up from a neighboring power line. Normally, power-line frequency is 60 cycles and in this case the rejection filter desirably has an absorption peak at 60 cycles. The second alternating-current amplifier 135 is connected in the output of the rejection filter. Inasmuch as these amplifiers amplify only the varying component of the current or voltage generated by the detector in response to the radiation falling thereon, they produce at the output an approximately sinusoidally-varying alternating-current signal having the same frequency as the beam-interruption frequency. This signal has an amplitude proportional to the intensity of selected radiation focused upon the detector, even though large proportions of non-interrupted black-body energy radiation from the walls of the compartments may also be falling on the photo-detector.

The amplified voltage appearing at the output of the amplifying unit 130, is then rectified by means of a full-wave mechanical rectifier 138 operated in synchronism with the shutter 86 to produce a unidirectional current which is then impressed upon the input of a variable period-control circuit 140. In effect, the over-all amplification factor of the entire amplifying means including both the amplifier unit 130 and a variable period-control circuit 140, described in more detail hereinafter, is periodically reversed in sign by this rectifier at the frequency of beam interruption. The direct-current signal appearing at the output of the variable period-control circuit 140, may be selectively impressed upon an indicating circuit 142, or upon an automatic recorder 144 by manipulation of a two-pole double-throw selector switch 146.

*Rectifier*

Considering the rectifier 138 in more detail and referring particularly to Figs. 5, 6, and 9 in addition to Fig. 1, it will be noted that the rectifier 138 is provided with two pairs of contacts 148 and 150 which are opened and closed alternately by means of a cam 152 in the form of an eccentric disk mounted upon a motor shaft 154 attached to the shutter shaft 93 by means of a phase-adjusting coupling 156. The alternating-current amplifier 135 preferably has a balanced push-pull output having a central output terminal 157 and two oppositely phased upper and lower output terminals 158 and 159 respectively. The two pairs of contacts 148 and 150 are connected between the respective outer terminals 158 and 159 and the upper input terminal 161 of the variable period-control circuit 140. The central output terminal 157 of the alternating-current amplifier is connected to the lower input terminal 162 of the variable period-control circuit. With this arrangement, full-wave rectification of the output of the alternating-current amplifier 135 is attained, and the double series of rectified pulses is applied to the variable period-control circuit.

For optimum results, the opening and closing of the two pairs of contacts 148 and 150 is synchronized with the operation of the shutter 86, taking account of phase changes in the amplifier unit 130, the opening and closing preferably occurring simultaneously with the reversal in sign of the fundamental frequency component of the voltage appearing at the output of the amplifier unit. This fundamental frequency, in cycles per second, is equal to the speed of the shaft, in revolutions per second when using a shutter of the type described. The phase-timing of the opening and closing of these contacts, may be adjusted by means of the adjustable coupling 156 between the motor shaft 154 and the shutter shaft 93, as more fully described hereinbelow.

By phasing the operation of the mechanical rectifier in the manner described, the signal-to-noise ratio attains the maximum value of which it is capable with the circuit elements involved.

With the adjustment described, the rectifier responds only to odd harmonics of the shaft-speed frequency. The latter may conveniently be an even sub-multiple of the A. C. line frequency, thus giving a marked degree of discrimination against frequency components at harmonics of the A. C. power-line frequency which may be introduced from the power supply into the amplifier either by magnetic pick-up from stray fields or by microphonic elements in the circuit responding to vibration from electrical machinery and the like. A further advantage of the mechanical rectifier is the linearity of its response even at low signal levels, in which respect it is considerably superior to conventional electronic rectifiers.

It is to be observed that the over-all amplification factor, or gain, of the entire amplifying system, including the amplifying means 130 and the rectifier 138 but not the period-control 140, is varied periodically by reversing the sign of this amplification factor and full-wave rectification is obtained. The amplification factor referred to is the algebraic ratio of the output to the input. If desired, the amplifier gain could be periodically varied by the use of only a single-contact rectifier instead of a double-contact mechanical rectifier, in which event half-wave rectification would be obtained and some of the advantages of the invention retained. While the invention may be practiced by periodically varying the amplifier gain in some other manner as well, the use of a double-contact rectifier of the type described has been found to be particularly effective.

*Variable period-control circuit*

In the conventional practice of infra-red spectrometry, a galvanometer or galvanometer amplifier may be employed to measure the current from the photo-detector, which is commonly a compensated thermo-pile. As is well known, the damping behavior or time-response characteristic of a galvanometer may be altered in various ways to provide under-damped, critically-damped or over-damped response. Its response period is defined in the conventional manner as the time in seconds required for the instrument to complete one cycle of oscillation, following the abrupt introduction of a suitable quantity of electricity, when completely undamped. The period is usually fixed within narrow limits by the design and construction of the galvanometer.

There is provided, in this invention, means by which both the effective period and the damping of the indicating device used may be conveniently varied over wide limits and quite independently, to permit the selection of a response characteristic best suited to a particular type of operation, whether, for example, it be for rapid scanning of the spectrum or for maximum resolution of a single-wavelength region.

The variable period-control circuit 140, useful in this connection, is shown in detail in Fig. 5. It includes a cathode-loaded triode 165 having a grounded cathode resistor 166 in its output and two stages of resistance-capacitance filter in its input. The two ganged variable resistors 168 and 169 of these filters are connected in series, in the order named, between the upper input terminal 161 and the signal grid 171 of the triode. The condenser 172 of the first filter section is connected to a point between these two resistors and to a sliding contact 173 on the cathode resistor 166. The condenser 174 of the second filter stage is connected between the signal grid 171 and ground 175. The impedances of the resistor 169 and the condenser 174 are in the same proportion, but sufficiently greater than those of the respective elements 168 and 172 of the first section of the filter that the second section does not present such a load to the first section as would appreciably alter its frequency-response function. In practice, a factor of five or more is adequate for this purpose.

The lower input terminal 162 is connected to ground 175 through sliding contact 176 of a variable rheostat at 177, having a battery 178 connected across its terminals. This contact 176 may be adjusted to produce zero voltage at the output of the variable period-control circuit when no alternating-current signal appears at the output of the amplifier unit. The output of this circuit is taken across two terminals, the upper terminal 180 of which is connected to the cathode end of the resistor 166 and the lower terminal 181 of which is connected to the grounded end of this resistor through the zeroing rheostat 177 and a record-marking resistor 182.

One of the advantages of this circuit resides in the fact that simultaneous and proportional variation of the impedance of resistors 168 and 169, or alternatively of capacitors 172 and 174, causes the effective high-frequency cut-off point of the entire period-control circuit 140 to change without substantially affecting the damping exhibited by an indicating device connected across its output. Also, the frequency above which signals are attenuated may be adjusted without affecting the over-all sensitivity of the amplifying means to the signals desired. Thus, this arrangement permits reduction of any high-frequency noise impressed upon the input of the variable period-control circuit without affecting sensitivity to slow changes as the spectrum is scanned. In practice, the cut-off frequency of the filter is established at a point considerably below the frequency of beam interruption, so that appreciable fluctuations at this frequency or important harmonics thereof do not appear in the output.

For purposes of later illustration, it will be assumed that normally the resistors 168 and 169 have three values corresponding to long, medium and short periods (i. e., low, medium, and high-frequency cut-offs respectively). All of these periods are relatively long compared to the interval between successive interruptions of the beam.

A further important advantage of the variable period-control circuit is that the effective damping of the response to a change of input signal applied across terminals 161 and 162 may be altered by adjusting the position of contact 173 on load resistor 166, from a strongly over-damped through a critically-damped, to a strongly under-damped condition. A partial compensation for possible undesirable characteristics of an indicating or recording device connected to the output terminals, and selection of an optimum response behavior is thus provided.

*Measurements of selected wavelengths*

It has been indicated above that the output of the amplifier means may be measured at individual wavelengths or may be automatically recorded over a wide range of wavelengths, by connecting either the indicator circuit 142 or the recorder 144 to the output of the amplifier means. Considering first the arrangement for measuring the intensity of radiation at selected wavelengths, when selected radiation of a predetermined wavelength is falling upon the detector 14, the two-pole double-throw switch 146 is moved to its upper position wherein the indicating circuit 142 is connected in the output of the amplifier means. This indicator circuit 142 includes a sensitive galvanometer 184, which may be selectively connected, by means of a three-pole switch 185, to the negative end of a balancing potentiometer 186 or to a sliding contact 187 of this potentiometer or to a fixed point of a voltage divider 189, the potentiometer and the voltage divider being connected in parallel across a source 190 of regulated direct-current voltage.

To illustrate the use of this indicating circuit, consider a case in which it is desired to measure the transmission coefficient of a sample at some wavelength within the range of the instrument. First, while the radiation traveling from the source 12 to the detector 14 is intercepted by means of an opaque filter on the slide 286 of Fig. 7, the zeroing rheostat 177 is adjusted to nullify the current in the output of the period-control circuit 140. Then while an empty or solvent-filled sample cell is located in the beam, the rotatable Littrow mirror 59 is set at a position corresponding to the wavelength in question and the galvanometer 184 is connected to the voltage divider 189. The instrument is then adjusted to bring the reading of the galvanometer 184 to the zero-current point. This is accomplished either by adjustment of the attenuator 133 or by adjustment of the slits 40, 60 in the monochromator 18 or both. When the output of the amplifier means has thus been balanced, it is known that the signal appearing at the output equals that corresponding to the voltage supplied by the voltage divider 189.

The meter 184 is then connected to the sliding contact 187 of the potentiometer 186 and the potentiometer adjusted by means of the knob 190 (see Fig. 2) to the point where the output of the amplifier means is balanced. The resistance of the potentiometer in the galvanometer circuit is measured or read from a calibrated scale 191 associated with the potentiometer and visible through the window 192 in the upper wall of the gas-sample testing compartment 22. Thereupon, a sample to be tested is inserted in the path of the beam. The potentiometer 186 is then balanced again against the output of the amplifier means, and the resistance of the potentiometer in the galvanometer circuit is again determined. The transmission coefficient of the sample may be calculated by dividing the resistance of the potentiometer included in the output circuit under the two conditions. It is to be noted that by measuring only the pulsating component of the radiation detected in the manner hereinbefore described, the transmission coefficient thus calculated is not rendered inaccurate by the presence of any stray black-body energy radiation reaching the detector.

When making the measurements referred to, the variable period-control circuit is manipulated to achieve the balancing action in a minimum time consistent with the accuracy desired. More particularly, the variable period-control circuit may be set at a short-period position during the initial stage of a balancing operation and at the long-period point in the final stage of a balancing operation. Thus, during the initial stage of balancing, the meter 184 responds to noise considerably, so that it fluctuates rapidly about the balance point. But because of the short time constant of the indicating circuit during this stage, the meter seeks its balance point rapidly, so that the apparatus may be manipulated rapidly to reach that balance point. In the later state of balancing the metering circuit has a long response period thus cutting out much of the higher frequency noise and permitting the pointer of the meter to remain relatively steady. During this stage of the operation, small slow adjustments may be made in the instrument to bring it to the proper balance point, thus permitting that balance point to be readily observed without being obscured by excessive noise.

*Scanning and recording apparatus, in general*

In order to scan the spectrum over an extended range and to obtain a continuous record of the spectrum over that range, the Littrow mirror 50 is rotated continuously over angles corresponding to that range by means of a linkage 195 (see Fig. 1) operated from a spiral cam 196 which is in turn driven by a reversible synchronous motor 198, through a connecting gear train 199, as more fully described hereinbelow. The driving coil 200 of a recording pen 202 in the recorder 144 is connected to the output of the amplifier means by setting the two-pole double-throw switch 146 in its lower position. A record strip 204 is drawn beneath the pen at a constant rate by means of a second synchronous motor 206. In practice, the wavelength drive motor 198 is energized first and the recorder motor 206 is subsequently energized at the time when the mirror 50 is brought to a position corresponding to some predetermined wavelength at which it is desired to begin the recording.

The use of two synchronous motors, one for driving the scanning system in the monochromator 18 and one for driving the record strip 204 in the recorder 154, facilitates the coordination of measurements at various wavelengths in the recorded spectrograms of different samples. This coordination is furthered by producing a series of marks on the spectrogram or recording strip simultaneously with its recording at positions corresponding to predetermined wavelength settings of the Littrow mirror 50. This is achieved, for example, by periodic insertion of marking signals in the output of the amplifier means synchronously with the scanning of the spectrum. Such marking signals are created in the present instance by periodically inserting a voltage from a battery 207 (Fig. 5) in the output of the period-control circuit 140 by periodically closing a switch 208 (Figs. 1 and 5) with a notched cam 210 (Fig. 1) driven by the scanning motor 198.

With this arrangement small pips are added to the record at regular intervals during the recording. Since the positions of these pips correspond to predetermined positions of the spiral cam 196, they likewise correspond to predetermined wavelength settings of the Littrow mirror 50 and may, therefore, be readily used to facilitate the interpretation of individual spectrograms or the coordination of a series of spectrograms.

During a recording, the period-control circuit may be set at its long-period position to attenuate noise, thus minimizing the widening of the record line by random fluctuations in the output signal. The value of the period selected should be short compared to the time rate of percentage change of radiation intensity as the spectrum is scanned, but otherwise as long as possible to facilitate accurate recording. When the spectrum is scanned slowly a long period setting should be used and when scanned rapidly a short period setting may be used to produce a comparable record.

*Source regulation*

In order further to stabilize the operation of the spectrophotometer and further to attain accuracy in results, the intensity of the radiation emitted from the source 12 is regulated in accordance with the intensity of radiation appearing in a portion of its spectrum. To achieve this result, a variable impedance 212 is coupled by transformer 215 between the source 12 and the power supply line from which the source 12 is energized. This impedance is varied as a function of the intensity of radiation emitted from the source, so that an increase in the intensity of such radiation causes a reduction in the amount of electrical power supplied to the source 12 and a decrease in the intensity of such radiation causes an increase in the amount of electrical power supplied to the source with the result that the intensity of radiation emitted is stabilized.

In the present instance this is achieved readily by means of a photoelectric cell 214 positioned to detect radiation in the relatively intense region of radiation emitted from the source 12. Such a cell may be of the type having its maximum response at about 0.8 $\mu$. The voltage output of the photoelectric cell 214 is applied through a load resistor 214a in the source compartment 20 to the input of an amplifier 216 whose output impedance varies inversely as the voltage supplied to the input. The output impedance of this amplifier is reflected into the power line in series with the source 12 by means of transformer 215 to attain the desired stabilization. The temperature regulation of the source compartment 20 assists in maintaining the characteristics of the photoelectric cell 214 and the load resistor 214a constant, thus regulating the radiation of the source accurately.

*Source compartment*

Considering now the preferred construction and detailed arrangement of various parts of the spectrometer, reference is further made to Figs. 7 to 10, inclusive, which illustrate various features of the apparatus included in the source compartment.

The source or lamp compartment 20 comprises an inner wall structure 231, in one corner thereof, which defines an auxiliary compartment within which the light source 12 itself and the associated regulating photoelectric tube 214 are mounted. This compartment 20 also comprises a wall structure 232 forming a totally-enclosed auxiliary gas-test cell comprising the auxiliary gas-sample region 15 and having an entrance window 234 adjacent the light source 12 and an exit window 235 opposite the exit aperture 32 of this compartment 20. The gas-sample region 15 is connectable to external gas-handling apparatus through an opening 235a. The concave mirror 28 is supported within this cell at the end thereof remote from the entrance and exit windows 234 and 235 in order to establish a long path over which radiation must travel through the gas within the cell between the two windows. The concave mirror 28 is adjustably inclined to the main beam path 25 in order to facilitate reflection of radiation from the source 12 along that path accurately. The entrance window is closed by an optically flat plate 236 composed of rock salt, which is transparent to radiation within the range of operation desired. The exit window 235 preferably carries the negative lens 30 in the form of a plano-concave lens composed of like material and which has such a focal length that the radiation emerging from the cell is collimated as a parallel ray beam.

With this arrangement, radiation diverging from the source 12 passes through an exit window 238 in the wall which encloses the source, thence normally through the plate 236 in the entrance window 234 to the concave mirror 28 which serves to reflect the radiation along the desired path 25 and to bring it to a virtual focus on the far side of the exit window 235. The reflected radiation converging upon the exit window is collimated by the lens 30 to produce the desired plane beam.

Figures 10, 13:
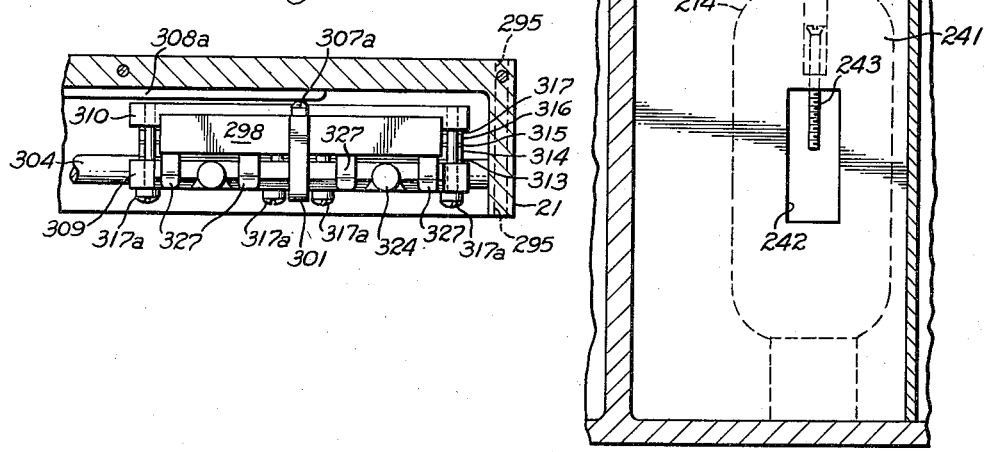
Fig. 10 is an elevational view of the wall between the radiation source and the regulating photo-tube taken on the line 10—10 of Fig. 7.
Fig. 13 is a plan view of the liquid-sample compartment with the cover-plate removed.

An intermediate wall 241 is located within the auxiliary compartment 231 midway between the source 12 and the photo-tube 214. As illustrated in Fig. 10 this wall includes an aperture 242 on a line between the source 12 and the photo-tube 214 to limit the amount of radiation transmitted from the source to the photo-tube. The opening of the aperture 242 is adjusted by means of a screw 243 depending thereinto through the upper portion of the wall 241 directly above the aperture as indicated in Fig. 7. Leakage of light from the source 12 to the photo-tube 206 is prevented by means of a removable lid 244 mounted at the top of the auxiliary compartment 231.

The sector 87 of the shutter 86 is secured rigidly to the shutter shaft 93 by means of a hub 240 as indicated in Fig. 8.

As previously explained, the temperature of the source compartment 20 is regulated by passing cooling fluid through a tubing 121 arranged therein. A portion of this tubing is soldered or otherwise attached to the floor 239 of the source compartment 20, and another portion thereof is soldered to an end wall 240a of the source compartment, or imbedded therein, or otherwise thermally attached thereto. By closely regulating the temperature of the source compartment, the temperatures of all elements therein are accurately maintained at a constant value. This feature is of particular benefit in maintaining the temperature of the photo-tube 214 and the associated load resistor 214a constant, as well as subjecting the source 12 to a constant ambient temperature. The actual temperature at which the incandescent element of the source 12 is maintained is thereby accurately regulated.

The synchronous motor 95 which drives the rotating shutter 86 is mounted within a separate and externally-open chamber defined by suitable wall structure 256 (Fig. 7). The motor shaft 154 is journalled in this wall structure and is connected to the shutter shaft 93 by means of the angularly adjustable coupling 156. The shutter shaft 93 is supported by means of a bearing 245 adjacent the shutter 86. The adjustable coupling includes two coupling members 258 and 259 which are rigidly secured to the respective shafts 93 and 154 by means of set screws 261 and 262, as indicated in Fig. 9. One of the coupling members 258 includes a cylindrical recess 263 into which a hub 264 on the other coupling member 259 is inserted to enable the two coupling members to be rigidly secured together by means of a set screw 265. With this coupling 156, the opening and closing of the switch contacts 148 and 150 may be time-phased with the rotation of the shutter by relative angular adjustment of the two coupling members 258 and 259. The end wall of the source compartment 20 is covered by a removable end plate 246. The portion of the plate 246 opposite the motor 95 is provided with a screen 247 to facilitate ventilation of the motor.

Referring to Fig. 6, it is to be noted that the rectifier 138 includes a cross-member 265 which is suitably supported from the wall of the compartment and in a horizontal position above the motor shaft 154 and transversely thereof. Two stationary arms 267 and 268 depend from this cross-member intermediate its ends and two pivoted arms 269 and 270 of channel cross-section depend from the outer ends thereof. The latter arms carry insulating fingers 272 and 273 at the outer ends thereof which are urged against the periphery of the disk cam 152 by means of a coil spring 275 adjustably attached to these two arms intermediate their respective ends. Adjustable stationary contacts 278 and 279 are arranged upon the two stationary arms 267 and 268 and two fixed contacts 281 and 282 are arranged upon the two outer arms 269 and 270. The two pairs of contacts 148 and 150 thus provided are adjusted so that each remains open and the other remains closed during alternate half rotations of the shaft 154. The contacts 281 and 282 on the two outer arms are connected to oppositely poled output terminals 158 and 159 of the alternating-current amplifier 135 and the two contacts 278 and 279 on the intermediate arms are connected to the upper input terminal 161 of the variable period-control circuit as illustrated in Fig. 5.

As the shutter 86 rotates the sector 87 thereon periodically interrupts the beam so that the intensity of radiation striking the detector 14 varies periodically at the frequency of shaft rotation and with an amplitude proportional to the intensity of the selected radiation being transmitted to the detector 14. The intensity of the radiation changes more or less abruptly each time that the shutter enters and leaves the beam being transmitted from the source 12 to the detector 14. The condenser 131 which is connected in the circuit between the detector 14 and the amplifying means 100 discriminates against any steady current flowing from the detector 14 to the amplifying means so that stray black-body radiation arriving at the detector 14 does not produce any substantial effect at the input of the amplifying means 130.

As a result of the pulsation of the intensity of the radiation of selected wavelength at the detector 14, a corresponding pulsating current is impressed upon the input of the amplifying means. This pulsating current has many frequency components, the fundamental component being of the frequency of beam interruption, that is, the same as the frequency of rotation of the shafts 154 and 93. As a result of the action of the tuned alternating-current amplifiers 132 and 135, the signal produced at the output of the amplifying means 130 varies approximately sinusoidally at the frequency of the fundamental component referred to. In order to achieve maximum sensitivity and maximum signal-to-noise ratio, the coupling 156 between the motor shaft 154 and the shutter shaft 93 is angularly adjusted to such a position that one pair of contacts of the mechanical rectifier 138 opens and the other pair of contacts closes each time that the fundamental component of the current in the output of the amplifying means 130 passes through zero.

An auxiliary chamber 284 (Fig. 7) is arranged transversely of the beam path between the exit window 235 of the auxiliary gas cell 15 and the exit opening 32 of the source compartment 20 so as to enable the insertion and withdrawal of a filter 285 having any desired properties into the path of the beam. Such a filter may be so manipulated by being supported upon a slide 286 arranged at the inner end of a rod, or operating arm, 287 extending through the compartment wall. This filter slide also carries a completely opaque shutter 288 which is convenient for adjusting the zero control 176 of Fig. 5, as mentioned before.

*Liquid-sample cells*

Figure 11:
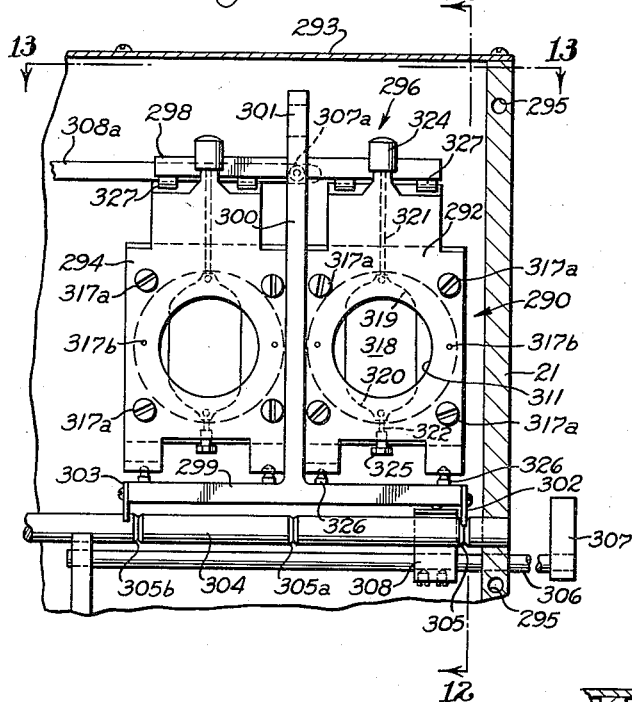
Fig. 11 is a fragmentary elevational view of the liquid-sample compartment, illustrating details of the liquid-sample holder arrangement.
Figure 12:
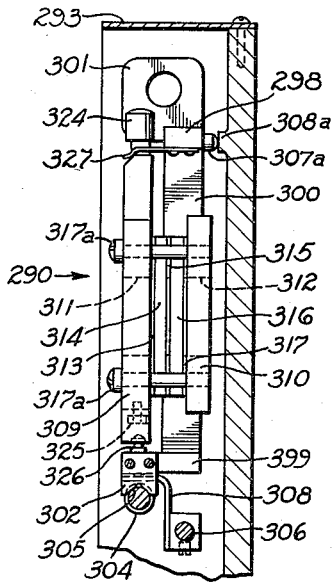
Fig. 12 is an end view of the liquid-sample holder arrangement.

Considering now the liquid-sample compartment, reference is made particularly to Figs. 11 to 13 inclusive, wherein there is shown a liquid-sample holder 290 comprising two liquid-sample test cells 292 and 294 corresponding to the cells 68a and 68b, previously mentioned, either one of which may be selectively positioned in the path of the collimated beam between the entrance aperture 33 of the liquid-sample compartment 21 and the exit aperture 35 thereof. The walls of the liquid-sample testing compartment 21 are in good thermal contact with the walls of the source compartment 20 and are also in contact with the walls of the gas-sample compartment 22 so that the temperature of this compartment 21 is maintained at a substantially constant value. This feature is of particular importance when analyzing liquid samples which have spectral characteristics that are temperature sensitive. It is also of importance where the liquid samples being tested have a large temperature coefficient of expansion, for, in the absence of such temperature regulation, a quantity of sample introduced into one of the liquid-sample cells would not be accurate. It is to be noted that the thermal contact of the liquid-sample compartment with the source compartment 20 and the gas-sample compartment 22 is achieved partly by virtue of the fact that this sample compartment 21 is rigidly secured between those two compartments by means of the bolts 100 heretofore mentioned which pass through bores 295 in the front and rear walls of the liquid sample compartment. This compartment 21 is provided with a removable lid 293 to permit ready access to the liquid-sample holder 280.

The liquid-sample holder 290 comprises a frame structure 296 having an upper cross-member 298 and a lower cross-member 299 interconnected by a central upright member 300 terminated at its upper end by a finger grip 301, by means of which the frame structure containing the cells may be removed from and arranged within the compartment 21. The lower cross-member 299 is supported at its outer ends by a pair of depending V-notched end plates 302 and 303 adapted to rest on a rod 304 extending lengthwise across the compartment transversely of and below the beam path. This rod provides front, intermediate and rear grooves 305, 305a, and 305b. When the front end plate 302 rests in the front groove 305, the cell 294 is disposed in the beam. When the end plate 302 rests in the intermediate groove 305a the cell 292 is disposed in the beam and when in the rear groove 305b, both cells are removed from the beam. The two notches 305 and 305a are so located upon the rod 304 that each of the liquid-sample cells may be disposed in substantially identical positions in the beam. Below and to one side of the rod 304 is a rotatable arm 306 which may be slid into and from the liquid-sample compartment. This arm 306 is operated by a handle 307 and carries a platform 308 above the rod 305 which may be used to lift the sample holder from one position on the rod and move it to another position. A pin 307a extending from the upright member 300 rests against a smooth bearing surface on a fixed horizontally extending land 308a to aid in supporting the liquid-sample holder in a vertical position.

Each of the liquid-sample test cells comprises metal plates 309 and 310 (Fig. 12) having coaxial circular bores 311 and 312 therein. Between these plates 309 and 310 there are arranged an annular amalgamated lead gasket 313, a rear rock-salt window 314, an apertured opaque spacer 315, a front rock-salt window 316, and a rubber gasket 317 in the order named. The foregoing elements are rigidly secured together by means of four screws 317a and are registered by means of alignment pins 317b extending through all of them. The aperture in the spacer 315 defines a liquid-sample chamber 318 between the two windows 314 and 316. This aperture is provided with an upper slot 319 which communicates through upper bores, in the rock-salt window 314 and the lead gasket 313, with a vertical adit bore 321 at the top of the plate 309. This aperture is also provided with a lower slot 320 which communicates through lower bores, passing through the rock-salt window 314 and the lead gasket 313, with a vertical exit bore 322 in the bottom of the plate 309. Upper and lower needle valves 324 and 325 are arranged in the adit and exit bores 321 and 322 respectively to facilitate filling and emptying the liquid chamber.

The cross-sectional area and the lengths and the shape of the two liquid-sample chambers 318 in the respective cells are made as nearly alike as possible and the windows of the different sample chambers are also made as nearly alike as possible in order to minimize corrections required in calculations from inequalities between the two cells.

Preferably, the cross-sectional area of the aperture of each cell, defined by the side wall of the spacer and the top and bottom portions of the plates, totally encloses the beam projected into the liquid-sample compartment so that the area of the beam transmitted through a liquid sample to the monochromator is independent of this area.

Each of the liquid-sample cells is clamped in the liquid-sample holder between a pair of upstanding pins 326 on the lower cross-member 299 and springs 327, extending transversely from the lower side of the upper cross-member 298.

This arrangement is capable of a wide variety of uses. For example, with this arrangement it is a relatively easy matter to make comparisons between liquid samples contained in different cells. Also, for example, in order to eliminate errors due to reflection losses at the interfaces between the liquid and the rock salt when a liquid sample under investigation is in one of the liquid-sample cells, a comparison run may be made with a sample of a non-absorbing liquid of about the same index of refraction in the other cell. Furthermore, both of the liquid-sample cells may be removed completely from the beam, when it is desired to make measurements of gas samples.

*Gas-sample cells*

Considering now the gas-sample compartment 22, reference is made particularly to Figs. 14 and 15, wherein is shown in detail the sample holder 72 comprising the two gas-sample testing cells 74a and 74b together with a mechanism for interposing either of the cells in the path of the beam to analyze gas samples and for withdrawing both the cells therefrom while non-gaseous samples are to be analyzed. The gas cells 74a and 74b are in the form of cylindrical tubes 339 and 340, each having a larger internal diameter than the largest cross-sectional dimension of the beam. Each tube is closed at its ends by means of rock-salt windows 341 and 342 suitably secured and hermetically sealed in place. The two tubes 339 and 340 are rigidly secured together by means of transverse rods 346 and 347 and two L-shaped pieces of tubing 349 and 350 connected together at their corners. These tubings provide connecting passages extending respectively between chambers 352 and 353 in the respective cells 74a and 74b and external gas handling apparatus.

The two cells are arranged with their axes parallel and the two tubings 349 and 350 terminate in outwardly-facing female ball-joint elements 355 and 356 at opposite ends of a third axis parallel to the axes of the cells and below the path 25 of the beam. The gas-sample holder 72 is arranged for rotation about this third axis by means of tube leads 358 and 359 provided with male ball-joint elements 361 and 362 complementary to the female elements at the ends of the tubings 349 and 350. The tube lead 358 is rigidly secured to the floor of the compartment and terminates in a vertically rising section upon which its ball-joint element 361 is elbowed. The tube lead 359 is pivotally supported about its length on the floor of the compartment 22 and terminates in a rising section upon which its ball-joint element 362 is elbowed. The two rising sections of the tube leads are normally urged together to seal the ball joints formed by said elements by means of a coil spring 364 connected between the movable tube lead 359 and the far wall of the compartment.

Gas samples may be introduced into and removed from the first gas-sample test cell 74a through the connecting tube 349 and the stationary tube lead 358 by suitable manipulation of external gas handling apparatus connected to this tube lead. In a similar manner gas samples may be introduced into and removed from the second gas-sample test cell 74b through the tube 359, the movable tube lead 359 and a stationary tube lead 367 with which the pivoted tube lead 359 is sealed by means of a ball joint 368.

Tubes 339, 340, 349, 350, 358 and 359 and the ball and socket couplings may conveniently be constructed entirely of glass, to gain the advantages of transparency and chemical inertness in this material.

The mechanism for moving the gas cells into and out of alignment with the path 25 of the beam includes a semi-circular gear 371 journalled in the wall of the compartment 22 directly beneath the light path 25 and attached by means of a shaft 373 to the gas-sample holder 72 coaxially with the ball joints about which the gas-sample holder rotates. The shaft 373 carries within the compartment 22 a sectored disk 375 having an arm 376 extending therefrom and rigidly secured to one of the rods 347 that interconnect the two gas cells. The disk 375 is provided with three notches 377, 378, and 379 on the periphery thereof, which are arranged to selectively engage a plunger 380 pushed upward from the floor of the compartment by means of a suitably arranged spring 381. The middle notch 378 corresponds to the position in which the two cells are in a neutral position withdrawn from the beam path. The remaining notches correspond to settings of one or the other of the gas cells in the beam path. The gas-sample holder is moved from one position to another by means of a rack 383 which engages the semi-circular gear 371 and which is operated by means of the operating rod 76 extending through the compartment wall.

When analyzing liquid samples with the apparatus hereinabove described, the gas-sample holder is held in its neutral position. However, when analyzing gas samples, the liquid-sample holder is held in its neutral position. Thereupon a series of gas samples may be tested in a number of ways. For instance, if it is desired to make direct comparison between two gas samples, the two samples are introduced into the two gas cells and the respective gas cells positioned in the path of the beam one at a time, a spectrogram of each being run in the manner hereinabove described. The two spectrograms are then compared to ascertain similarities and differences between the samples. If it is desired to obtain spectograms for a series of samples, such as a mixture and pure samples of each of its components, one of the samples in question is fed into one of the sample cells and, while a spectogram on this sample cell is being run, another sample is fed into the other sample cell. Then while the second sample cell is positioned in the beam to obtain the spectogram of the enclosed sample, the first sample is evacuated from the first cell and replaced by a third sample. The third sample is then tested and the second sample replaced by a fourth and so on until all samples have been tested, the entire operation being accelerated by virtue of the fact that one sample cell can be filled with a new sample while the sample in the other cell is being tested. The freedom of the spectrophotometer from zero drift and variations in source intensity greatly facilitates these operations. This feature permits direct comparison between curves, taken under like conditions except for samples, to be made with assurance that differences of appreciably larger magnitude than any "noise," or random fluctuations, represent significant differences between samples.

The wall 43 separates the main portion of the gas-sample compartment 22 from the auxiliary compartment section 19 in which the mirror 62, the mirror 64, the lens 65, and the radiation detector 14 are located. The upper horizontal portion of said wall 43 of this compartment section is located entirely beneath the beam path 25. The plane mirror 62 is secured to the wall 43 within the compartment section 19 opposite the aperture 44b, and is so oriented that the radiation transmitted thereto through the exit slit 60 of the monochromator 18 is reflected toward the concave mirror 64 which in turn focuses this radiation through lens 65 upon the detector 14.

The passages 120 used for cooling the gas-sample compartment 22 may be in the form of tubes secured to the walls thereof in good thermal contact therewith in any convenient manner. By controlling the temperature of this compartment, the quantities of the gas-samples introduced into the gas cells 14a and 14b are accurately controlled thus practically eliminating gas-density errors. Also by controlling the temperature of this compartment, the characteristics of the detector 14 and the associated electric equipment 131a mounted in the auxiliary compartment 19 are maintained uniform thus avoiding calibration errors from this source.

*Monochromator*

Considering now the monochromator 18, and more particularly the slit-width control mechanism, reference is made to Figs. 16, 18, and 19 wherein there is illustrated a pair of slit-defining jaws 387 and 388 which are provided with mating curved edges and which are divided into upper and lower portions by transverse slots 391 and 392. The upper portions of the slit jaws 387 and 388 define the entrance slit 40 opposite the entrance aperture 45a and the lower portions of the slit jaws define the exit slit 60 opposite the exit aperture 45b. The two slits, defined by the upper and lower portions of the slit jaws 387 and 388, are masked from each other by means of a vane 394 projecting horizontally through the slots. This vane is carried by a cross piece 395 supported from the end wall of the monochromator crosswise of the two slits.

The two slit jaws 387 and 388 are arranged to be moved toward and away from each other together, so that both slits may be closed or opened simultaneously to the same extent. To accomplish this unison of movement, the two slit jaws 387 and 388 are rigidly secured to two working jaws 397 and 398 which are supported at their upper ends on blocks 400 and 401 and which are adapted to be moved horizontally while maintaining an orientation parallel to the floor of the monochromator. The nearly horizontal motion of each working jaw is achieved respectively by means of two pairs of vertical support arms 403, 403, and 404, 404, each of which is resiliently connected by a corresponding flexible hinge member 406, 406 and 407, 407 to one of the blocks 400, 401, and also resiliently supported by corresponding flexible hinge members 409, 409 and 410, 410 on one of two base members 411 and 412 attached to the floor of the monochromator. More particularly, the upper cross block 400, the two vertical cross arms 403, 403 and the base member 411 provides one parallelogram arrangement for moving the first slit jaw 387 and the first working jaw 397 nearly horizontally and without rotation. Also, the upper cross arm 401, the two vertical cross arms 404, 404 and the base members 412 provide another parallelogram arrangement for moving the second slit jaw 388 and the second working jaw 389 nearly horizontally and without rotation.

The flexible hinge members 406, 406, and 407, 407 are pre-loaded in such a manner as to urge the slit jaws 387 and 388 together in slit-closing relationship. Also, they are pre-loaded in such a manner as to press the two working jaws 397 and 398 against adjustable bearings 413 projecting from the wall of the compartment 23. Thus the slit-forming edges of the defining jaws 387 and 388 may be adjusted to lie at all times in one plane and to maintain their orientation relative to each other except for the motion of separation.

Two masking vanes 399, supported angularly from the walls of the compartment 23 at positions adjacent the slit jaws, serve to reduce scattering of light through the exit slit 60.

An oblate cam 414 is arranged between two opposed fingers 415 and 416 constituting the upper ends of the working jaws 397 and 398. This oblate cam 414 may be rotated to move the jaws aparat against the pressure of the flexible hinge members by operation of a gear 417 which is operated by a worm 418 mounted upon a shaft 420 extending through the upper wall 422 of the compartment 23, and connected externally to a knob 423. A spur pinion 425 on the shaft 420 drives a large gear 426 which carries a dial 428 calibrated in terms of slit-width. This dial is carried upon the upper face of the large gear 426, and is viewable through a window 430 in the upper wall 422 of the compartment. A pointer 432 mounted between the window 430 and the dial 428 is used to indicate slit-width.

In considering the spectrum scanning mechanism and wavelength selecting mechanism illustrated in Figs. 17, 18 and 20 to 25 inclusive, it is well to recall that heterogeneous radiation entering the monochromator 18 through the upper slit 40 is reflected by the stationary concave mirror 46 to the stationary dispersing prism 48 and thence to the rotatable Littrow plane mirror 50 being returned along a similar path to the lower or exit slit 60 and thence to the detector 14 as previously explained in connection with Fig. 1. Also, as previously explained, a spectrum of the radiation is present at the plane of the slit 60 and the wavelength of the particular radiation which is focused upon the exit slit depends upon the position of the Littrow mirror 50. The position of the mirror 50 may be selectively set at predetermined positions corresponding to predetermined wavelengths, to make spot checks, by means of a turret stop mechanism 433 in the monochromator or it may be turned continuously from one position to another to scan the entire spectrum, as by use of a scanning mechanism 434 in the monochromator.

An auxiliary compartment 435 is arranged within the compartment 23 and is hermetically sealed thereto. This auxiliary compartment 435 includes all of the portions of the monochromator 18 through which radiation passes from the entrance slit 40 to the exit slit 60. More particularly, the portions of the slit-width-control mechanism including the slit jaws 387 and 388 and the working jaws 397 and 398 and various slit-width-controlling elements associated therewith, are located within the auxiliary compartment 435 at one end thereof. Also more particularly, the stationary concave mirror 46 is adjustably supported within the auxiliary compartment 435 at the other end thereof. The dispersing prism 43 is also adjustably but rigidly secured within the auxiliary compartment 435 at a position offset from the beam path 25 and on the opposite side of normals to the concave mirror 46 from the slits 40 and 60 as hereinabove explained.

The Littrow mirror 50 is rigidly but adjustably mounted upon a casting 436 which is pivotally supported upon a stationary casting 437 within the auxiliary compartment 435. The casting 436, upon which the Littrow mirror 50 is mounted, is rigidly secured to a rotatable cross-arm 438 arranged externally of the auxiliary compartment 435. Two truss arms 439 and 440 are rigidly fastened to opposite ends of the cross-arm 438, the shorter truss arm 440 being rigidly secured to the longer truss arm 439 by means of a clamp 441 at about its midpoint. The longer of these truss-arms 439 extends to a point opposite the turret-stop mechanism 433.

A cam-follower arm 442 is pivoted upon a bracket 443 to swing about an axis parallel to the pivot axis of the Littrow mirror 50. This arm 442 is connected to the clamp 441 in conjoint driving relationship with the truss arms 439 and 440. A link 444 is pivotally supported upon the clamp 441 and is urged to a home position in a pocket 446 upon the cam-follower arm 442 by means of a coil spring 448 connected between the cross-arm 438 and the wall of the compartment 23. The homing of this link 444 is facilitated by means of a funnel 450 which is pivotally connected to the follower arm 442 with its apex bounding the pocket 446. The truss arms 439 and 440, the cam-follower arm 442, and the link 444 comprise the linkage 195 (Fig. 1) which cooperates with the cam 196 to scan a spectrum.

The cam 196 is provided with a downwardly projecting spiral or scroll cam element 452 upon its lower face which engages an upwardly projecting cam-follower pin 454 on the cam-follower arm 442. This pin 454 is held against the cam element 452 by means of a spring 456 connected to the follower arm 442 through a wire 458 which is stretched over a series of pulley wheels 459, 459. The wheels 459 are so positioned that the cam-follower pin 454 is held against the inner surface of the cam element 452, and the wire 458 returns to the back of the auxiliary compartment 435 along a line 457 parallel to the general direction of motion of the cam-follower pin. An arm 460, attached at one end to the wire 458, is arranged to slide upon two rods 462, 462 in a direction parallel to the line 457, and in a plane above the cam 196. A window 464 is arranged in the arm 460 directly above that radius of the cam 196 which is parallel to the line 457. Within this window, there is supported a wavelength indicating crosshair 465, and which is located directly above and parallel to said radius. The upper surface of the cam 196 carries a wavelength dial 466 on which is printed a spiral scale 466a calibrated in wavelength, this scale spiralling in a direction opposite to the spiral cam element 452. The cross-hair 465 and the portion of the spiral scale 466a under it is visible through a window 466b in the top wall of the compartment 23.

The cam 196 may be rotated manually either by a main knob 467 at the outer end of its shaft 468 or by means of a vernier knob 470 carried at the outer end of a jack-shaft 471 upon which is arranged a pinion gear 472 engaging a gear 473 disposed on the periphery of the cam 196. The jack-shaft 471 carries a gear 474 which engages another gear 475 of equal diameter which carries the cam 210 which operates the switch 208.

The gear 475 engages a smaller gear 478 which is arranged to revolve freely about a rotatable tubular shaft 479. The upper face 480 of the latter gear 478 is arranged to engage a clutch plate 482 which is normally urged downward against the face 480 by means of a helical spring 484 encompassing the tubular shaft 479. The clutch plate 482 is connected, by means of a pin 485 passing through slots 486 in the tubular shaft 479, to the lower end of a plunger 488. This plunger is arranged to be raised against the pressure of the spring 484 by means of a handle 490 pivotally attached to the upper end of the shaft 488 and carrying cam elements 491 at the lower end thereof for engaging the upper end of the tubular shaft 479. This tubular shaft is journalled upon an intermediate cross-piece 493 and supported thereon by means of collars 494 and 495.

The tubular shaft carries three gears 497, 498, and 499 of different sizes rigidly secured thereto at its upper end. These three gears 497, 498, and 499 are selectively engageable by three corresponding gear trains 502, 504 and 506 all driven on a common shaft 506 from the reversible motor 198. This shaft carries a knob 508 at the outer end thereof for changing the speed at which the tubular shaft is driven. By suitable manipulation of the clutch handle 490 the gear 478 may be clutched and de-clutched from the motor 198. While declutched, the cam 196 may be rotated manually by manipulation of one of the knobs 467 or 470, as hereinabove described, and while clutched the cam may be driven at any one of three speeds corresponding to the setting of the knob 508.

Consider now the operation of the scanning mechanism 434, commencing with the cam-follower pin 454 at the outermost end of the cam element 452. In this position, radiation of wavelength $15\mu$ emerges from the exit slit 60. As the cam 196 turns upon its axis, the position of the Littrow mirror 50 is altered in a corresponding manner through the conjoint action of the cam-follower arm 442 and the truss arms 439 and 440, thus causing radiation of shorter and shorter wavelengths to be focused upon the exit slit 60 until the pin reaches its innermost position where radiation of wavelength $1\mu$ emerges from the exit slit. Concurrently, the indicating crosshair 465 moves radially outwardly of the cam 196, successively passing over different portions of the spiral scale 466a printed upon the wavelength dial 466 and indicating at each position the approximate central wavelength of the band of radiation then in focus upon the exit slit 60.

When the motion of the cam 196 is reversed, the cam-follower pin 452 is moved radially inward and the indicating crosshair 465 moves radially outward, again, however, indicating at each position the approximate wavelength of the radiation then in focus upon the exit slit 60. The motion of the cam 196 may be reversed simply by suitable manipulation of the main knob 467 or the vernier knob 470, and it may also be reversed by reversing the rotation of the motor 198 electrically.

Attention is directed to the fact that the wavelength of the radiation passing through the exit slit 60 though indicated nominally by the scale 466a actually may differ therefrom by a slight amount varying with the deviation of the actual operating temperature from some standard temperature at which the scale has been calibrated. This discrepancy between the actual wavelength of the radiation passing through the exit slit 60 and the nominal wavelength indicated by the scale is very largely due to changes with temperature of the refractive index of the material of which the prism 48 is composed. This difficulty is overcome by maintaining the temperature of all parts of the monochromator 18 at a standard value by flowing fluid at a standard temperature through tubing 114 and 115 welded to the walls of the compartment 43 as indicated particularly in Figs. 17 and 26.

It is to be noted that the tubing 115 is attached to a removable cover member 510 and the tubing 116 is attached to a stationary base member 512 as indicated in Fig. 26. The base member 512 is in the form of a hollow wall comprising a solid lower member 513 and an upper member 514 provided with apertures 515. This base member 512 has an opening 516 at the exposed end thereof through which a tray 517 carrying suitable dessicators may be inserted.

To assure proper drying of the air in the monochromator another dessicator box 518 is secured over an opening in the auxiliary compartment 435 as illustrated in Fig. 18. This box has a plurality of windows 519 therein covered internally with filter paper 520 and a screen 521 to confine pulverized dessicating material 522 therein. Dessicators (not shown) of similar construction are likewise arranged in the source compartment 20 and the gas-sample compartment 22 to assure complete drying of any air present in them.

When the cam-follower pin 454 is in its outermost radial position, the Littrow mirror 50 may be effectively disconnected from the scanning mechanism 434 by turning a crank arm 525 from its retracted full-line position to an operating dotted-line position by manipulation of a knob 526 (Fig. 2) at the outer end of the shaft 527 as indicated particularly in Figs. 17, 23, and 24. When the crank arm 525 is moved into its operating position a wheel 528 at its outermost end is clamped by a curved leaf spring 529 in a position where the wheel engages the long truss arm 439 and holds it in a retracted position against the force of the spring 448 withdrawn from the turret structure 433 and released from the cam-follower arm 442. Thus the crank arm 525 serves to remove the link 444 from the cam-follower arm 442 releasing the truss arms 439 and 440 and the cam-follower arm 442 from their joint action. Conversely, whenever the crank arm 525 is returned to its retracted position, the link 444 is guided by the funnel 450 into its home position wherein it completes the linkage 195 for providing conjoint movement of the cam-follower arm 442 and the truss arms 439 and 440.

*Turret stop mechanism*

The turret stop mechanism 433 which serves to set the Littrow mirror 50 at selected predetermined positions comprises a drum 538 which is arranged upon a horizontal shaft 539 and is rotatable about the shaft axis by means of an external manual control knob 540 operating through a one-to-one gear train 541. A plurality of threaded pins 543 are arranged circumferentially about the face 545 of the drum 538 remote from the gear train 541. These pins extend from the drum 538 toward the long truss arm 439 and are provided with bearings 546 at their outer ends as illustrated in Fig. 25. The drum 538 is so located that, as it is rotated, each of the pins 543 may in turn engage a fixed bearing plate 547 at the end of the long truss arm 439, and thus hold the mirror 50 in a predetermined position corresponding to a predetermined wavelength when the crank arm 525 is returned to its retracted position.

The pins 543 are preferably of different lengths and are preferably threaded into threaded bores of the drum 538 to permit fine wavelength adjustments, the pins being preferably locked in their positions on the drum by means of set screws 548 arranged on the periphery of the drum. Each pin 543 may be accurately registered with the bearing plate 547 by means of a register pin 550 which engages one of a plurality of corresponding register slots 551 on the outer surface 552 of the drum 538 as illustrated in Fig. 24. The register pin 550 is carried by a leaf spring 554 which normally urges the pin toward the surface 552 of the turret drum and into one of the register slots 551 but the register pin may be withdrawn from such slot by means of a lift arm 556 carried on the same shaft 527 as the crank arm 525. This lift arm comes into operation to disengage the register pin 555 from a register slot when the crank 525 is moved into its operating position to engage the long truss arm 439.

The particular pin 543 which is in position to engage the long truss arm 439 at any time, is indicated on a dial 557 mounted externally of the compartment 23 by a pointer 558 attached to the inner end of the knob 540 as indicated in Figs. 2, 3, and 17.

To calibrate the monochromator, the turret stop mechanism 433 is first turned to a position in which no pin 543 is capable of engaging the bearing plate 547 in any position throughout the entire range of movement of the long truss arm 439. Then a series of samples, having sharp absorption bands at known wavelengths are positioned one at a time either in a gas-sample cell or a liquid-sample test cell, as the case may be. The wavelength cam 196 is then turned to a position corresponding to an absorption band of known wavelength and the portion of the wavelength dial 466 then located directly beneath the indicating crosshair 465 is marked to indicate that wavelength. When a sufficiently large number of such wavelengths are so indicated, the dial is removed from the monochromator and calibrated carefully throughout the entire range of the instrument by interpolation.

Once the wavelength dial 466 has been carefully calibrated, the turret stop mechanism 433 may be calibrated as desired for setting upon any selected set of wavelength positions. This may be done, for example, by setting the cam 196 at one of these positions, then installing upon the drum 538 one of the pins 543 and then adjusting the length of this pin until it just engages the bearing plate 547. Alternatively, since it is usually desired to adjust the turret head to particular positions corresponding to certain absorption regions, a sample characterized by the absorption band in question is positioned in the spectrophotometer and then the wavelength cam 196 is turned to a position corresponding to a point of maximum absorption in one of these bands as indicated on the meter 184 (Fig. 2). Thereafter, a corresponding pin 543 of suitable length is screwed into the turret drum 538 and then with the cam 196 so set and the link 444 engaged, this pin is unscrewed so that its bearing 546 travels toward bearing plate 547 to the point where it just engages the bearing plate 547. The position at which it engages the bearing plate 547 may be indicated by the fact that the arm 439 lifts out of engagement with the cam-follower arm 442 thus turning the mirror 50 and increasing the signal indicated by the meter 185, a minute change in reading indicating incipient disengagement of the two arms. When the length of the pin 543 is so adjusted, it is locked tightly in its position by means of a corresponding set screw 548. This procedure is repeated at different wavelengths until a set of pins of suitable length are arranged upon the turret drum. With this method of calibration, very accurately reproducible results may be quickly and conveniently obtained.

In making a spectrogram of an unknown sample, the turret drum is turned to a position in which no pin 543 interferes with the movement of the long truss arm 439 and a record is made, in the manner previously explained. When it is desired to make a series of spot checks of a sample at predetermined wavelengths corresponding to the various lengths of pins installed upon the turret head, the cam 196 is rotated to a position in which the cam-follower pin 454 is in its outermost position. Also the crank arm 525 is moved to a position in which the wheel 526 engages the long truss arm 439, thereby disengaging the mirror 50 from the cam 196. The knob 540 is then turned to a position corresponding to the predetermined wavelength at which measurements are desired. Then the crank 525 is returned to its retracted position thereby permitting the bearing plate 547 to seat itself upon the pin with which it is then in register. After the measurements are made at the wavelength corresponding to that pin, the crank 525 is again moved to the position in which it engages the long truss arm 439 thereby lifting the bearing plate 527 from the previously engaged pin. The knob 540 is then rotated to position a second pin in register with the bearing plate 527 and the procedure repeated. This same procedure is repeated as often as desired within the limits established by the number of pins arranged upon the turret head.

It is to be emphasized that many problems in spectroscopy arise which may vary from those referred to specifically in the above disclosure, and that corresponding variation in the test procedure must be made in order to solve these particular problems. The basic principles involved in approaching the solution to these problems will, however, be the same as those hereinabove set forth, and the variations that may be necessary therein in order to accommodate these principles to special problems will be apparent to those skilled in the art from the foregoing disclosure. Accordingly, the invention is not to be limited to the various details of apparatus and test procedure described in detail hereinabove, and it is to be understood that various modifications and changes may be made therein within the scope of the appended claims.

Some of the features shown herein are common to the copending application Serial No. 722,038 filed on January 14, 1947, by me jointly with Roland C. Hawes and Kenyon P. George.

I claim as my invention:

1. In a spectrophotometer, the combination of: a source of heterogeneous radiation; a radiation detector; a monochromator having an entrance opening and an exit opening; means in said monochromator for separating from heterogeneous radiation entering said entrance opening selected radiation of a predetermined wavelength and transmitting said selected radiation out of said exit opening; means defining a liquid-sample test region; means defining a gas-sample test region spaced from said liquid-sample region; an optical system for transmitting radiation from said source through said liquid-sample region and through said gas-sample region and through said monochromator to said detector, said optical system including a first means for transmitting the radiation through said liquid-sample region as a collimated beam and a second means for transmitting said radiation through said gas-sample region as a non-collimated beam; a liquid-sample test cell; means for moving said liquid-sample test cell between a position in said liquid-sample region wherein its intercepts said collimated beam and a position withdrawn therefrom; a gas-sample test cell; and means for moving said gas-sample test cell between a position in said gas-sample region wherein its intercepts said non-collimated beam and a position withdrawn therefrom.

2. In a spectrophotometer the combination of: a source of heterogeneous radiation; a radiation detector; a monochromator having an entrance opening and an exit opening; means in said monochromator for separating from heterogeneous radiation entering said entrance opening selected radiation of a predetermined wavelength and transmitting said selected radiation out of said exit opening; means defining a liquid-sample region; means defining a gas-sample region spaced from said liquid-sample region; an optical system for transmitting radiation from said source through said liquid-sample region and through said gas-sample region, and through said monochromator to said detector, said optical system including a first means for transmitting the radiation through said liquid-sample region as a collimated beam and a second means for transmitting the radiation through said gas-sample region as a non-collimated beam; a liquid-sample holder comprising a plurality of liquid-sample test cells; means for moving said liquid-sample holder between a plurality of positions in said liquid-sample test region in one of which all liquid-sample test cells are withdrawn from the beam and in each of the remaining positions a corresponding liquid-sample test cell intercepts said collimated beam; a gas-sample holder comprising a plurality of gas-sample test cells; and means for moving said gas-sample holder between a plurality of positions in said gas-sample region in one of which all gas-sample test cells are withdrawn from the beam and in each of the remaining positions a corresponding gas-sample test cell intercepts said non-collimated beam.

3. In a spectrophotometer, the combination of: a source of diverging heterogeneous radiation; a radiation detector; a monochromator having an entrance opening and an exit opening; means defining a liquid-sample region; means defining a gas-sample region spaced from said liquid-sample region; a first optical means for transmitting the radiation diverging from said source through said liquid-sample region as a collimated beam; a second optical means for converging the collimated beam after it has been transmitted through said liquid-sample region and transmitting the converging beam through said gas-sample region and to the entrance opening of said monochromator; means in said monochromator for separating from heterogeneous radiation entering said entrance opening selected radiation of a predetermined wavelength and transmitting said selected radiation out of said exit opening; means for transmitting said selected radiation from the exit opening of said monochromator to said detector; a liquid-sample test cell; means for moving said liquid-sample test cell in said liquid-sample region between a position in said collimated beam and a position outside of said collimated beam; a gas-sample test cell; and means for moving said gas-sample test cell in said gas-sample region between a position in said converging beam to a position outside of said converging beam.

4. In a spectrophotometer, the combination of: a source of diverging heterogeneous radiation; a radiation detector; a monochromator having an entrance opening and an exit opening; means defining a relatively short liquid-sample region; means defining a relatively long gas-sample region; a first optical means including a lens disposed adjacent the entrance of said liquid-sample test region for transmitting the radiation diverging from said source through said liquid-sample region as a collimated beam; a second optical means including a lens disposed between said two test regions for converging the collimated beam after it has been transmitted through said liquid-sample test region and transmitting the converging beam through said gas-sample test region upon the entrance opening of said monochromator; means in said monochromator for separating from heterogeneous radiation entering said entrance opening selected radiation of a predetermined wavelength and transmitting said selected radiation out of said exit opening; means for transmitting said selected radiation from the exit opening of said monochromator to said detector; a relatively short liquid-sample test cell; means for moving said liquid-sample test cell in said liquid-sample region between a position in said collimated beam and a position outside of said collimated beam; a relatively long gas-sample test cell; and means for moving said gas-sample test cell in said gas-sample region between a position in said converging beam to a position outside of said converging beam, each of said cells being disposed with their lengths along the path of the beam when positioned therein.

5. In a spectrophotometer, the combination of: a source of heterogeneous radiation; a radiation detector; a monochromator having an entrance opening and an exit opening, said monochromator including means for separating from heterogeneous radiation entering said entrance opening selected radiation of a predetermined wavelength and transmitting said selected radiation out of said exit opening; means defining two sample regions; an optical system for transmitting radiation from said source through said two sample regions in sequence and then through said monochromator to said detector, said optical system including first means for transmitting the radiation through one sample region as a collimated beam and second means for transmitting said radiation through the other sample region as a non-collimated beam; a support in said one sample region for a non-gaseous sample; means for moving said support between a position in which said non-gaseous sample intercepts said collimated beam and a position withdrawn therefrom; a gas-sample test cell in said other sample region; and means for moving said gas-sample test cell between a position in which it intercepts said non-collimated beam and a position withdrawn therefrom.

6. In a spectrophotometer of the type which can indicate the radiation intensity transmitted to a radiation detector from a source of radiation, the combination of: means comprising a movable optical element for receiving heterogeneous radiation from said source and separating therefrom and transmitting to said detector selected radiation of wavelength determined by the position of said optical element; an arm connected to move said optical element to vary the wavelength of the selected radiation; drive means including an actuating element for progressively moving said arm and means for operatively disengaging said arm from said actuating element to permit independent movement of said arm and its connected optical element; a stop means adapted to be moved into the locus of independent movement of said arm, said stop means being adjustable to move said arm, and said optical element, so as to disengage said arm from said actuating element; an indicating means connected to said radiation detector for indicating minute changes in the radiation reaching said detector; and means operable while said arm is located in a selected position by said actuating element for adjusting the position of said stop means until a minute change in said indicating means indicates incipient operative disengagement of said arm from said actuating element, thereby setting said stop means to quickly set said arm at such selected position at any later time when said stop means is moved into the locus of independent movement of said arm.

7. In a spectrophotometer employing a source of radiation for transmitting radiation to a radiation detector, the combination of: a pivoted supporting member; means receiving radiation from said source for transmitting to said detector radiation of selected wavelength, said means comprising an optical element mounted on said supporting member to pivot therewith, the selected radiation being determined by the position of said optical element; an arm connected to said supporting member to control the pivoting movement thereof and of said optical element mounted thereon, movement of said arm varying the wavelength of the selected radiation; a cam operative to swing said arm over a range of positions corresponding to a range of wavelengths; recording means for recording changes in intensity of radiation reaching said detector, said recording means including a movable element; means for simultaneously driving said movable element and said cam at related speeds; resilient means for normally urging said arm into operative relation with said cam; and an adjustable stop means for selectively holding said arm in predetermined positions against the force exerted by said resilient means and out of operative relationship with said cam whereby selected radiation of wavelength corresponding to said predetermined position is transmitted to said radiation detector.

8. In a spectrophotometer for measuring the radiation intensity from a source of radiation, the combination of: a radiation detector means comprising a movable optical element for receiving heterogeneous radiation from said source and separating therefrom and transmitting to said detector selected radiation of a wavelength determined by the position of said optical element;

an arm connected to move said optical element to vary the wavelength of the selected radiation; drive means including a cam operative to move said arm over a range of positions corresponding to a range of wavelengths; means for selectively rendering said drive means operative and inoperative relative to said arm; means including a stop means for said arm for selectively setting said arm in predetermined positions corresponding to predetermined wavelengths of selected radiation while said drive means is inoperative relative to said arm, said stop means being adjustable to move said arm, and said optical element, so as to disengage said arm from said cam; means for adjusting at least one of said positions while said arm is operatively engaged with said cam; and means connected to said detector to indicate incipient operative disengagement between said arm and said cam.

9. In a spectrophotometer for measuring the radiation intensity transmitted from a source of radiation, the combination of: means comprising a movable optical element for receiving heterogeneous radiation from said source and separating therefrom and transmitting selected radiation of a wavelength determined by the position of said optical element; a first position-controlling means including a first arm connected to move said optical element to vary the wavelength of the selected radiation, a cam-follower arm, a cam for moving said cam-follower arm, and operating means for transmitting the motion of said cam-follower arm to said first arm, said operating means including means for releasing said arms from conjoint movement to permit movement of said first arm independent of movement of said cam-follower arm; a second position-controlling means including means for selectively setting said first arm in one of a plurality of positions corresponding to predetermined wavelengths of selected radiation while said arms are released from conjoint movement; and means for checking the accuracy of said positions, said last named means comprising means for indicating a change in said transmitted radiation upon alternate operation of said first and second position-controlling means.

10. In a spectrophotometer for measuring the intensity of radiation transmitted from a source of radiation, the combination of: a frame; means comprising a movable optical element for receiving heterogeneous radiation from said source and separating therefrom and transmitting selected radiation of a wavelength determined by the position of said optical element; an arm movable relative to said frame and connected to move said optical element to vary the wavelength of the selected radiation; a plurality of stop members each adapted to be interposed between said arm and said frame and to operatively engage said arm to set said optical element in a predetermined position; a cam; means for selectively engaging said arm operatively with said cam and with a selected one of said stop members; and means including a radiation detector receiving said transmitted radiation to indicate selective operative engagement of said arm with said cam and a selected one of said stop members to check the position of the latter.

11. A combination as defined in claim 10, including a movable support carrying said stop members and means for selectively moving said movable support to dispose said stop members selectively in the locus of motion of said arm.

12. In a spectrophotometer, the combination of: a source of infra-red radiation; a radiation detector; optical means including a movable optical element for transmitting a beam of selected radiation of predetermined wavelength along a predetermined path from said source to said detector; movable means carrying a wavelength indicating dial for positioning said optical element in a position for directing selected radiation of an indicated wavelength indicated by said dial to said detector, said predetermined wavelength differing from said indicated wavelength by an amount varying with the deviation of the temperature from a standard value; a sample holder adapted to support a sample to be tested in said path; compartment means comprising walls enclosing said source, said detector, said optical means, and said sample holder; means for maintaining the temperature of said walls substantially at said standard value; a variable-apertured slit-defining means spaced from said walls and disposed in said path for adjusting the wavelength band of selected radiation transmitted to said detector along said path; means periodically varying the intensity of said selected radiation directed along said path to said detector; and means connected to said detector for measuring the amplitude of variation of the intensity of the selected radiation reaching said detector.

13. In a spectrophotometer, the combination of: a source of infra-red radiation; a radiation detector; optical means for transmitting a beam of selected radiation of predetermined wavelength along a predetermined path from said source to said detector; a sample holder adapted to support in said path a sample having a spectral absorption characteristic dependent upon the temperature of the sample; compartment means comprising walls enclosing said source, said detector, said optical means, and said sample holder; means for regulating the temperature of said walls; a variable-apertured slit-defining means spaced from said walls and disposed in said path for adjusting the wavelength band of selected radiation transmitted to said detector along said path; means for periodically varying the intensity of said selected radiation directed along said path to said detector; and means connected to said detector for measuring the amplitude of variation of the intensity of the selected radiation reaching said detector.

14. In a spectrophotometer, the combination of: a source of infra-red radiation; a radiation intensity regulator including a temperature-sensitive photo-tube and photo-tube load impedance operatively associated with said source; a radiation detector; optical means for transmitting a beam of selected radiation of predetermined wavelength along a predetermined path from said source to said detector; a sample holder adapted to support a sample to be tested in said path; compartment means comprising walls enclosing said source, said photo-tube, said load impedance, said detector, said optical means, and said sample holder; means for regulating the temperature of said walls; a variable-apertured slit-defining means spaced from said walls and disposed in said path for adjusting the amount of selected radiation transmitted to said detector along said path; means for periodically varying the intensity of said selected radiation directed along said path to said detector; and means connected to said detector for measuring the amplitude of variation of the intensity of the selected radiation reaching said detector.

15. In a spectrophotometer, the combination of: a source of radiation; a radiation intensity regulator including a temperature-sensitive photo-tube and photo-tube load impedance operatively associated with said source; a radiation detector; electric circuit elements associated with said detector; optical means including a movable optical element for transmitting a beam of selected radiation of predetermined wavelength along a predetermined path from said source to said detector; movable means carrying a wavelength indicating dial for positioning said optical element in a position for directing selected radiation of a nominal wavelength indicated by said dial to said detector, said predetermined wavelength differing from said nominal wavelength by an amount varying with the deviation of the temperature from a standard value; a sample holder adapted to support in said path a sample having a spectral absorption characteristic dependent upon the temperature of the sample; compartment means comprising walls enclosing said source, said photo-tube, said load impedance, said detector, said electric circuit elements, said optical means, and said sample holder; means for maintaining the temperature of said walls at said standard value; a variable-apertured slit-defining means spaced from said walls and disposed in said path for adjusting the amount of selected radiation transmitted to said detector along said path; means for periodically varying the intensity of said selected radiation directed along said path to said detector; and means connected to said electric circuit elements for measuring the amplitude of variation of the intensity of the selected radiation reaching said detector.

16. In a spectrophotometer, the combination of: first and second mirrors located at opposite ends of an extended path and inclined thereto; a source of radiation offset from said path and located adjacent said first mirror for directing radiation thereto to be reflected therefrom along said path; radiation-dispersing means offset from said path and located adjacent said second mirror for receiving heterogeneous radiation reflected therefrom and returning dispersed radiation thereto to be reflected along a return path axially disposed to one side of said extended path; first compartment means enclosing said source of radiation and said first mirror; second compartment means enclosing said radiation-dispersing means and said second mirror; a removable wall means between said compartments and defining a sample testing region; a lens for collimating the radiation reflected from said first mirror before this radiation reaches said sample testing region whereby the radiation is transmitted through said sample testing region as a collimated beam, the size of said removable wall means determining the length of said extended path; a lens disposed in said extended path beyond said sample testing region for converging said collimated beam; a first variable-apertured slit-defining means disposed in said extended path adjacent the point of convergence for defining the beam transmitted to said second mirror; a second variable-apertured slit-defining means spaced from said first slit-defining means and disposed in said return path for limiting the wavelength band of selected radiation transmitted therethrough; and means for measuring the intensity of the selected radiation transmitted through said second slit-defining means.

17. A spectrophotometer as defined in claim 16 including means for conjointly adjusting the widths of the slits of said first and second slit-defining means.

18. In a spectrophotometer, the combination of: first and second mirrors located at opposite ends of an extended path and inclined thereto; a source of radiation offset from said path and located adjacent said first mirror for directing radiation thereto to be reflected therefrom along said path; radiation-dispersing means offset from said path and located adjacent said second mirror for receiving heterogeneous radiation reflected therefrom and returning dispersed radiation thereto to be reflected along a return path axially disposed to one side of said extended path; first compartment means enclosing said source of radiation and said first mirror; second compartment means enclosing said radiation-dispersing means and said second mirror; wall means for spacing said two compartment means along said extended path to define a sample testing region of any desired length therebetween; a lens for collimating the radiation reflected from said first mirror before this radiation reaches said sample testing region whereby the radiation is transmitted through said sample testing region as a collimated beam; a lens disposed in said extended path beyond said sample testing region for converging said collimated radiation toward a point on said extended path between said lens and said second mirror; a first variable-apertured slit-defining means intersecting said extended path adjacent the point of convergence for defining the beam transmitted to said second mirror; a second variable-apertured slit-defining means spaced from said first slit-defining means and intersecting said return path for limiting the wavelength band of selected radiation transmitted therethrough; a third mirror disposed in said return path and inclined thereto for reflecting said selected radiation; and a radiation detector for receiving the selected radiation reflected by said third mirror.

19. A spectrometer as defined in claim 18 in which said extended path is straight between said first and second mirrors, and in which said source, said dispersing means, and said detector are located on the same side of said straight extended path.

20. In a spectrophotometer, the combination of: first and second mirrors located at opposite ends of an extended path and inclined thereto; a source of infra-red radiation offset from said path and located adjacent said first mirror for directing infra-red radiation thereto to be reflected therefrom along said path; radiation-dispersing means offset from said path and located adjacent said second mirror for receiving heterogeneous radiation reflected therefrom and returning radiation of a selected wavelength thereto to be reflected along a return path axially disposed to one side of said extended path; first compartment means enclosing said source of radiation and said first mirror; second compartment means enclosing said radiation-dispersing means and said second mirror; means for spacing said two compartment means along said extended path to define a sample testing region of desired length therebetween and through which the radiation is transmitted as a collimated beam; a lens disposed in said extended path for converging said collimated beam; a first variable-apertured slit-defining means disposed in said extended path adjacent the point of convergence for defining the beam transmitted to said second mirror; a second variable-apertured slit-defining means spaced from said first slit-defining means and disposed in said return path for limiting the wavelength band of selected radiation transmitted therethrough; a detector arranged to receive said band of selected radiation; means for regulating the temperature of the walls of said two compartment means; means for periodically varying the intensity of selected radiation directed to said detector; and means connected to said detector for measuring the amplitude of variation of the intensity of the selected radiation directed thereto.

21. In a spectrophotometer, the combination of: first and second mirrors located at opposite ends of an extended path and inclined thereto; a source of infra-red radiation offset from said path and located adjacent said first mirror for directing infra-red radiation thereto to be reflected therefrom along said path; radiation-dispersing means offset from said path and located adjacent said second mirror for receiving heterogeneous radiation reflected therefrom and returning radiation of a selected wavelength thereto to be reflected along a return path axially disposed to one side of said extended path; first compartment means enclosing said source of radiation and said first mirror; second compartment means enclosing said radiation-dispersing means and said second mirror; wall means for spacing said two compartment means along said extended path and defining a sample testing region therebetween; a lens for collimating the radiation reflected from said first mirror before this radiation reaches said sample testing region whereby the radiation is transmitted through said sample testing region as a collimated beam; a lens for converging said collimated beam toward a point on said extended path between this lens and said second mirror; a first variable-apertured slit-defining means disposed in said extended path adjacent the point of convergence for defining the beam transmitted to said second mirror; a second variable-apertured slit-defining means spaced from said first slit-defining means and disposed in said return path for limiting the wavelength band of selected radiation transmitted therethrough; common means for conjointly adjusting the widths of the slits of said first and second slit-defining means; a third mirror disposed in said return path and inclined thereto for reflecting said band of radiation; a radiation detector located adjacent said third mirror for receiving the selected radiation reflected thereby; and means for regulating the temperature of the walls of said two compartment means and said wall means.

22. In a spectrophotometer, the combination of: first and second mirrors located at opposite ends of an extended path and inclined thereto; a source of infra-red radiation offset from said path and located adjacent said first mirror for directing infra-red radiation thereto to be reflected therefrom along said path; radiation-dispersing means offset from said path and located adjacent said second mirror for receiving heterogeneous radiation reflected therefrom and returning radiation of a selected wavelength thereto to be reflected along a return path axially disposed to one side of said extended path; first compartment means enclosing said source of radiation and said first mirror; second compartment means enclosing said radiation-dispersing means and said second mirror; a first lens carried by said first compartment means and disposed in said extended path for transmitting radiation along said extended path out of said first compartment means as a collimated beam to said second compartment means through a sample testing region between said compartments; a second lens carried by said second compartment means and disposed in said path for converging said collimated beam toward a point on said extended path between said second lens and said second mirror; a first variable-apertured slit-defining means disposed in said extended path adjacent the point of convergence for defining the beam transmitted to said second mirror; a second variable-apertured slit-defining means spaced from said first slit-defining means and disposed in said return path for limiting the wavelength band of selected radiation transmitted therethrough along said return path; and a detector arranged to receive said band of selected radiation.

23. In a spectrophotometer, the combination of: first and second mirrors located at opposite ends of an extended path and inclined thereto; a source of infra-red radiation offset from said path and located adjacent said first mirror for directing infra-red radiation thereto to be reflected therefrom along said extended path; radiation-dispersing means offset from said path and located adjacent said second mirror for receiving heterogeneous radiation reflected therefrom and returning radiation of a selected wavelength thereto to be reflected along a return path axially disposed a very small distance to one side of said extended path, said return path being almost parallel to said extended path; first compartment means enclosing said first mirror; second compartment means enclosing said radiation-dispersing means and said second mirror, said compartments being spaced from each other along said extended path to provide therebetween a sample testing region; a lens carried by said second compartment means and disposed in said extended path for converging the radiation reflected from said first mirror toward a point on said extended path between this lens and said second mirror; a single pair of slit-defining jaws traversing said extended path adjacent the point of radiation convergence and also traversing said return path, said jaws being spaced from each other a slight distance to define between one portion of the paired jaws a first slit disposed in said extended path and to define between another portion of the paired jaws a second slit disposed in said return path for limiting the wavelength band of selected radiation transmitted through said second slit along said return path; means for simultaneously moving said slit-defining jaws toward and away from each other to adjust simultaneously the widths of said slits; a third mirror in the path of said selected radiation transmitted through said second slit; and a radiation detector in the path of said selected radiation reflected by said third mirror.

24. In a spectrophotometer, the combination of: a supporting structure; a source of radiation carried by said supporting structure; means including an optical element adapted to receive radiation from said source for transmitting selected radiation of a wavelength determined by the position of said optical element relative to said supporting structure; a carriage for said optical element carried by said supporting structure, said carriage being movable relative to said supporting structure to vary the position of said optical element relative thereto so as to vary the wavelength of the selected radiation; movable stop means including a plurality of stops each adapted to be interposed between said carriage and said supporting structure and to operatively engage said carriage to locate said optical element in a predetermined position relative to said supporting structure; drive means for said carriage; means for selectively operatively engaging said carriage with said drive means and with one of said stops; and means including a radiation detector receiving said transmitted radiation for indicating selective operative engagement of said carriage with the drive means and with one of said stops.

HENRY H. CARY.

REFERENCES CITED

The following references are of record in the file of this patent:

UNITED STATES PATENTS

| Number | Name | Date |
| --- | --- | --- |
| 947,490 | Guozdz | Jan. 25, 1910 |
| 2,065,953 | Twyman et al. | Dec. 29, 1936 |
| 2,107,836 | Pineo | Feb. 8, 1938 |
| 2,170,435 | Sweeney | Aug. 22, 1939 |
| 2,206,521 | Akker et al. | July 2, 1940 |
| 2,221,170 | Richardson | Nov. 12, 1940 |
| 2,227,510 | Pineo | Jan. 7, 1941 |
| 2,233,062 | Pineo | Feb. 25, 1941 |
| 2,269,674 | Liddel et al. | Jan. 13, 1942 |
| 2,314,800 | Pineo | Mar. 23, 1943 |
| 2,328,293 | Pineo | Aug. 31, 1943 |
| 2,329,657 | Shurcliff | Sept. 14, 1943 |
| 2,339,053 | Coleman | Jan. 11, 1944 |
| 2,359,736 | Kienle et al. | Oct. 10, 1944 |
| 2,404,064 | Heigl et al. | July 16, 1946 |
| 2,417,321 | Park et al. | Mar. 11, 1947 |
| 2,431,019 | Barnes | Nov. 18, 1947 |
| 2,436,511 | Flatford et al. | Feb. 24, 1948 |
| 2,442,298 | Liston | May 25, 1948 |
| 2,451,572 | Moore | Oct. 19, 1948 |